United States Patent
Srinivasan et al.

(10) Patent No.: US 8,484,397 B1
(45) Date of Patent: Jul. 9, 2013

(54) VARIOUS METHODS AND APPARATUS FOR A MEMORY SCHEDULER WITH AN ARBITER

(75) Inventors: Krishnan Srinivasan, Cupertino, CA (US); Drew E. Wingard, Palo Alto, CA (US)

(73) Assignee: Sonics, Inc., Milpitas, CA (US)

( * ) Notice: Subject to any disclaimer, the term of this patent is extended or adjusted under 35 U.S.C. 154(b) by 0 days.

(21) Appl. No.: 13/479,578

(22) Filed: May 24, 2012

Related U.S. Application Data

(63) Continuation of application No. 12/402,707, filed on Mar. 12, 2009, now Pat. No. 8,190,804.

(51) Int. Cl.
*G06F 12/00* (2006.01)
*G06F 13/00* (2006.01)

(52) U.S. Cl.
USPC ............. 710/244; 710/29; 710/240; 710/243; 711/148; 711/151; 711/157

(58) Field of Classification Search
USPC ..................... 710/29, 240–244; 711/148, 151
See application file for complete search history.

(56) References Cited

U.S. PATENT DOCUMENTS

| | | | | |
|---|---|---|---|---|
| 4,348,741 A * | 9/1982 | McAlister et al. | ............. | 710/244 |
| 6,026,451 A * | 2/2000 | Sreenivas | ......................... | 710/39 |
| 6,578,117 B2 * | 6/2003 | Weber | ............................ | 711/151 |
| 6,804,738 B2 * | 10/2004 | Weber | ............................ | 710/244 |
| 6,976,106 B2 * | 12/2005 | Tomlinson et al. | ............ | 710/113 |
| 6,976,109 B2 | 12/2005 | Shenderovich | | |
| 6,979,109 B2 * | 12/2005 | Burton | ............................ | 362/460 |
| 7,120,714 B2 * | 10/2006 | O'Connor et al. | ............ | 710/243 |
| 7,149,829 B2 * | 12/2006 | Weber et al. | .................... | 710/243 |
| 7,155,554 B2 * | 12/2006 | Vinogradov et al. | ......... | 710/305 |
| 7,191,273 B2 * | 3/2007 | Weber | ............................ | 710/244 |
| 7,266,786 B2 * | 9/2007 | Chou et al. | .................... | 716/105 |
| 7,296,104 B2 * | 11/2007 | Smith et al. | .................... | 710/106 |
| 7,296,105 B2 | 11/2007 | Weber | | |
| 7,478,183 B2 * | 1/2009 | Pathak et al. | ................. | 710/116 |
| 7,739,436 B2 * | 6/2010 | Meyer | ............................ | 710/111 |
| 7,814,243 B2 * | 10/2010 | Hamilton | ........................ | 710/52 |
| 8,190,804 B1 | 5/2012 | Srinivasan et al. | | |
| 2005/0010890 A1 * | 1/2005 | Nehmadi et al. | ................ | 716/19 |
| 2008/0288731 A1 * | 11/2008 | Izumi | ............................ | 711/160 |
| 2008/0320254 A1 * | 12/2008 | Wingard et al. | ............. | 711/157 |
| 2008/0320255 A1 * | 12/2008 | Wingard et al. | ............. | 711/157 |
| 2008/0320268 A1 * | 12/2008 | Wingard et al. | ............. | 711/202 |

(Continued)

OTHER PUBLICATIONS

"Sonics MemMax 2.0 Multi-threaded DRAM Access Scheduler DataSheet"—6 pages, No Date Provided.

(Continued)

*Primary Examiner* — Brian Misiura
(74) *Attorney, Agent, or Firm* — Rutan & Tucker, LLP

(57) ABSTRACT

Various methods and apparatus are described for a memory scheduler. The memory scheduler has a pipelined arbiter to determine which request will access the target memory core. Pipelining occurs in stages within the arbiter over a period of more than one clock cycle. The pipelined arbiter uses two or more weighting factors affecting an arbitration decision that are processed in parallel. A predictive scheduler in the memory scheduler uses data from a previous cycle to make the arbitration decision about a request during a current clock cycle in which the arbitration decision is made in order to increase overall system efficiency of requests being serviced in the integrated circuit.

19 Claims, 14 Drawing Sheets

U.S. PATENT DOCUMENTS

| | | | | |
|---|---|---|---|---|
| 2008/0320476 | A1* | 12/2008 | Wingard et al. | 718/101 |
| 2009/0235020 | A1* | 9/2009 | Srinivasan et al. | 711/106 |
| 2010/0042759 | A1* | 2/2010 | Srinivasan et al. | 710/35 |
| 2010/0115167 | A1* | 5/2010 | Tardieux et al. | 710/240 |
| 2010/0115196 | A1* | 5/2010 | Hamilton | 711/108 |

OTHER PUBLICATIONS

Weber, Wolf-Dietrich, "Efficient Shared DRAM Subsystems for SaCs" from Sonics Inc. 6 pages, Dated 2001.

Wingard, Drew, "High-performance Multithreaded Memory Subsystems for MPSoC's" 15 pages, Dated Jun. 27, 2007.

Schwaderer, David, "Solving SOC Shared Memory Resource Challenges" 8 pages, Dated Jun. 27, 2003.

Gupta, S., Gupta, R.K. "ASIC Design", The VLSI Handbook, Ed. Wai-Kai Chen, Boca Raton: CRC Press LLC, 2000, Chapter 64,29 Pages.

Cotrell, D. "Design Automation Technology Roadmap", The VLSI Handbook, Ed. Wai-Kai Chen, Boca Raton: CRC Press LLC, 2000, Chapter 78, 41 Pages.

Copyright 1999, Marcel Dekker Inc., Chapter 5 "Computer Aided Design", 95 Pages.

Love, John J., USPTO Memorandum, Apr. 12, 2007, Deputy Commissioner for Patent Examination Policy, to Technology Center Directors, "Clarification of Interim Guidelines for Examination of Patent Applications for Subject Matter Eligibility", 2 Pages.

Office Action for U.S. Appl. No. 12/402,707 mailed Aug. 27, 2010, 55 pages.

Office Action for U.S. Appl. No. 12/402,707 mailed Feb. 16, 2011, 15 pages.

Office Action for U.S. Appl. No. 12/402,707 mailed Jul. 11, 2011, 10 pages.

Final Office Action for U.S. Appl. No. 12/402,707 mailed Nov. 25, 2011, 7 pages.

Notice of Allowance for U.S. Appl. No. 12/402,707 mailed Feb. 2, 2012, 5 pages.

* cited by examiner

Figure 9  Flow for parts of absolute filter

Table 1 : Group Assignment for threads

| Thread ID | Group Number |
|---|---|
| 0,1,2,3 | 0 |
| 4,5,6,7 | 1 |
| 8,9,10,11 | 2 |
| 12,13,14,15 | 3 |

Table 2 : Auto Group Assignment

| Group | Thread |
|---|---|
| 0 | 0, 4, 6, 10 |
| 1 | 14, 3, 7, 11 |
| 2 | 13, 2, 8, 12 |
| 3 | 5, 1, 9, 15 |

VARIOUS METHODS AND APPARATUS FOR A MEMORY SCHEDULER WITH AN ARBITER

RELATED APPLICATIONS

This application is a continuation of and claims the benefit of U.S. patent application Ser. No. 12/402,707, filed 12 Mar. 2009, titled 'Various methods and apparatus for a memory scheduler with an arbiter' and now U.S. Pat. No. 8,190,804 issued on May 29, 2012.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to a memory scheduler with an arbiter.

BACKGROUND OF THE INVENTION

The performance of a Dynamic Random Access Memory (DRAM) memory system is dependent on the accesses that are presented to it. A system with a high page-hit rate generally performs better than one with a lower page-hit rate. Improvements in the operating frequency of underlying DRAM controllers can be made at its memory interface. The memory scheduler attempts to improve DRAM utilization by using a weighted arbiter.

SUMMARY OF THE INVENTION

Various methods and apparatus are described for a memory scheduler. An interconnect in an integrated circuit communicates requests and responses between multiple initiator IP cores and multiple target IP cores coupled to the interconnect. An address map with assigned addresses for the target IP cores and initiator IP cores supports routing the requests and responses between the target IP cores and initiator IP cores in the integrated circuit. A memory scheduler coupled to a target memory core may include a bank of memories. The address space in the target memory core is addressable through the memory scheduler. The memory scheduler has a pipelined arbiter to determine which request will access the target memory core. Pipelining occurs in stages within the arbiter over a period of more than one clock cycle. The pipelined arbiter uses two or more weighting factors affecting an arbitration decision that are processed in parallel. A predictive scheduler in the memory scheduler uses data from a previous cycle to make the arbitration decision about a request during a current clock cycle in which the arbitration decision is made in order to increase overall system efficiency of requests being serviced in the integrated circuit.

BRIEF DESCRIPTION OF THE DRAWINGS

The drawings refer to embodiments of the invention in which:

FIGS. 12a and 12b illustrate tables of an embodiment of thread grouping to improve scalability of pipeline arbiter using two or more weighting factors;

Figure 1:
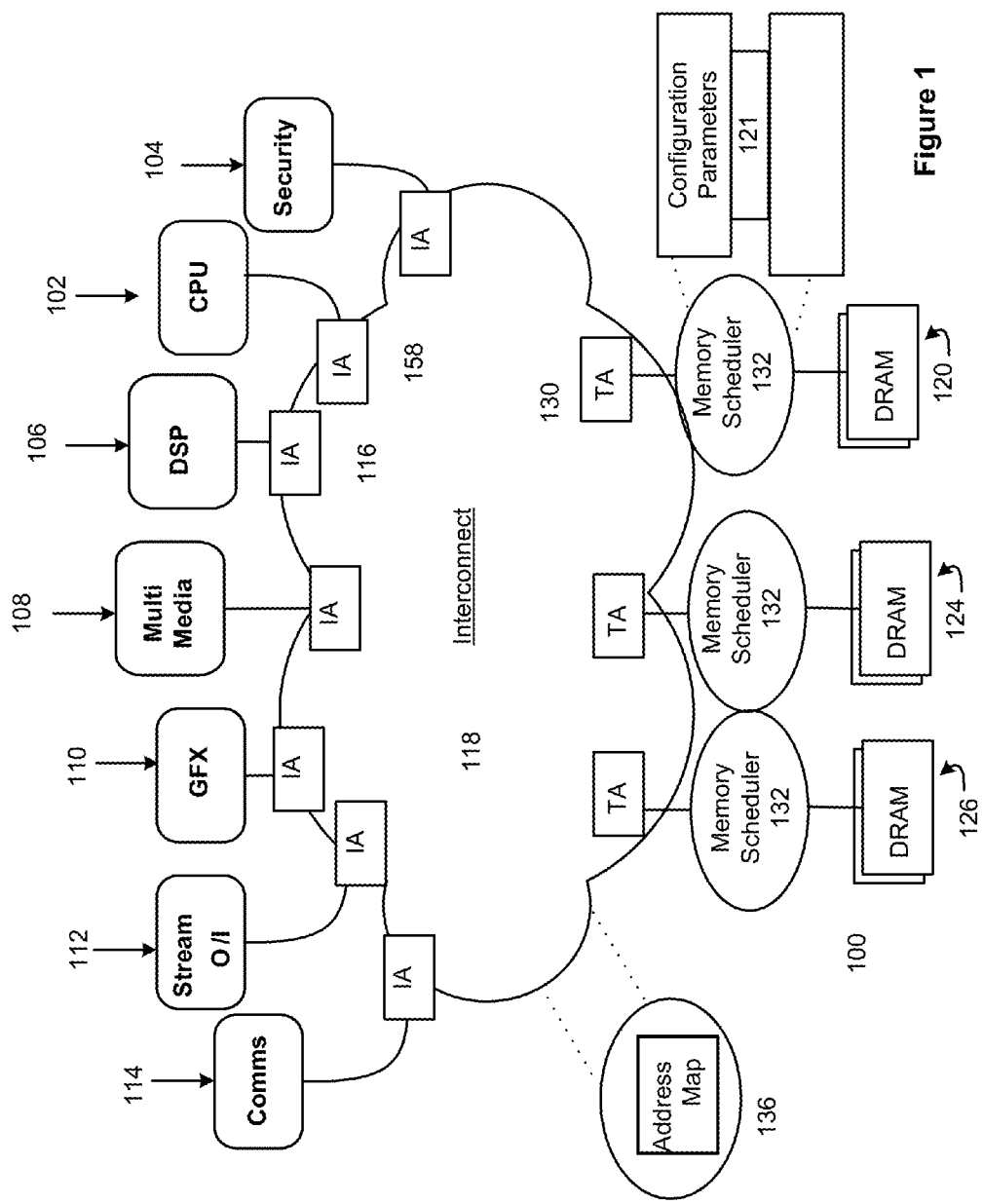
FIG. 1 illustrates a block diagram of an embodiment of a System-on-a-Chip having multiple initiator IP cores and multiple target IP cores that communicate read and write requests as well as responses to those requests over an interconnect.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of address bits, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first target, may be made. However, the specific numeric reference should not be interpreted as a literal sequential order but rather interpreted that the first target is different than a second target. Thus, the specific details set forth are merely exemplary. The specific details may be varied from and still be contemplated to be within the spirit and scope of the present invention. Further features in one embodiment may be used in another embodiment.

In general, various methods and apparatus are discussed for a memory scheduler. An interconnect in an integrated circuit communicates requests and responses between multiple initiator IP cores and multiple target IP cores coupled to the interconnect. An address map with assigned addresses for the target IP cores and initiator IP cores supports routing the requests and responses between the target IP cores and initiator IP cores in the integrated circuit. A memory scheduler coupled to a target memory core may include a bank of memories. The address space in the target memory core is addressable through the memory scheduler. The memory scheduler has a pipelined arbiter to determine which request will access the target memory core. Pipelining occurs in stages within the arbiter over a period of more than one clock cycle. The pipelined arbiter uses two or more weighting factors affecting an arbitration decision that are processed in parallel. A predictive scheduler in the memory scheduler uses data from a previous cycle to make the arbitration decision about a request during a current clock cycle in which the arbitration decision is made in order to increase overall system efficiency of requests being serviced in the integrated circuit.

FIG. 1 illustrates a block diagram of an embodiment of an integrated circuit, such as a System-on-a-Chip, having multiple initiator IP cores and multiple target IP cores that communicate read and write requests as well as responses to those requests over an interconnect. Each initiator IP core, such as a CPU IP core 102, an on-chip security IP core 104, a Digital Signal Processor (DSP) 106 IP core, a multimedia IP core 108, a Graphics IP core 110, a streaming Input-Output (I/O) IP core 112, a communications IP core 114 and other similar IP cores may have its own initiator agent 116 to interface with the interconnect 118. Each target IP core such as a first DRAM IP core 120 through a third DRAM IP core 126 may have its own target agent 130 to interface with the interconnect 118. Each DRAM IP core 120-126 may have an associated memory scheduler 132 as well as a DRAM controller.

The Intellectual Property cores (IP) have self-contained designed functionality to provide that macro function to the system. The interconnect 118 implements an address map 136 with assigned address for the target IP cores 120-126 and potentially the initiator IP cores 102-114 in the system to route the requests and potentially responses between the target IP cores 120-126 and initiator IP cores 102-114 in the integrated circuit. One or more address generators may be in each initiator IP core to provide the addresses associated with data transfers that the IP core will initiate to memories or other target IP cores. All of the IP cores may operate at different performance rates (i.e. peak bandwidth, which can be calculated as the clock frequency times the number of data bit lines (also known as data width), and sustained bandwidth, which represents a required or intended performance level). Most of the distinct IP cores communicate to each other through the memory IP cores 120-126 on and off chip. The DRAM memory schedule 132 abstracts the real addresses in each DRAM IP core 120-126 from other on-chip cores by performing a tiling function to performing address transformation of addresses in a request to physical addresses in the memory itself.

The DRAM memory scheduler 132 is connected downstream of a target agent 130 interfacing the interconnect 118. The interconnect 118 provides a shared communications bus between IP core sub-systems 120-126 and 102-114 of the system. All the communication paths in the shared communication bus need not pass through a single choke point rather many distributed pathways may exist in the shared communication bus. The on-chip interconnect 118 may be a collection of mechanisms that may be adapters and/or other logical modules along with interconnecting wires that facilitate address-mapped and arbitrated communication between the multiple Intellectual Property cores 102-114 and 120-126.

The interconnect 118 may be part of an integrated circuit, such as System-on-a-Chip, that is pipelined with buffering to store and move requests and responses in stages through the System-on-a-Chip. The interconnect 118 may have flow control logic that is 1) non-blocking with respect to requests from another thread as well as with respect to requiring a response to an initial request before issuing a subsequent request from the same thread, 2) implements a pipelined protocol, and 3) maintains each thread's expected execution order. The interconnect also may support multiple memory channels, with 2D and address tiling features, response flow control, and chopping of individual burst requests. Each initiator IP core may have its own initiator agent to interface with the interconnect. Each target IP core may have its own target agent to interface with the interconnect.

The interconnect 118 implements an address map 136 with assigned address for target IP cores 124-126 in the integrated circuit 100 to route the requests between the target IP cores and initiator IP cores in the integrated circuit and a first target of the target IP cores 124-126 that includes a [DRAM] bank of memories coupled to the memory scheduler 132 that contains a weighted parallel arbiter 121.

The memory scheduler 132 coupled in between the interconnect 118 and a target memory core of the target IP cores that includes a DRAM bank of memories, such as a first DRAM 120. The address space in a given memory core is addressable through a memory scheduler 132. The memory scheduler 132 has a pipelined arbiter 121 to determine which request will access the target DRAM memory core 120. Pipelining occurs in stages within the arbiter 121 over a period of more than one clock cycle. The pipelined arbiter 121 uses two or more weighting factors affecting an arbitration decision that are processed in parallel.

The pipelined arbiter 121 determines which request will access the memory. A predictive scheduler in the memory scheduler 132 uses data from a previous cycle to make the arbitration decision about a request during a current clock cycle in which the arbitration decision is made in order to increase overall system efficiency of requests being serviced in the integrated circuit.

Each memory core 120-126 may be a single memory or multiple external DRAM chips ganged together to act as a single memory make the width of a data word such as 64 bits or 128 bits. Each IP core and DRAM chip may have multiple banks inside that IP core/chip. Each channel may contain one or more buffers that can store requests and/or responses associated with the channel. These buffers can hold request addresses, write data words, read data words, and other control information associated with channel transactions and can help improve memory throughput by supplying requests and write data to the memory, and receiving read data from the memory, in a pipelined fashion. The buffers can also improve memory throughput by allowing a memory scheduler 132 to exploit address locality to favor requests that target a memory page that is already open, as opposed to servicing a different request that forces that page to be closed in order to open a different page in the same memory bank.

An initiator IP core itself and system software are decoupled from knowing the details of the organization and structure of the memory system when generating the addresses of requests going to memory targets. Requests from the initiator cores, such as a CPU 102, to perform memory operations can be address tiled into individual memory addresses by the memory scheduler 132. Thus, the memory scheduler 132 may also decode/translate a system's memory target address sent in a request to determine a defined memory segment's actual physical location on a chip i.e. (Rank, bank, row and column address information) rather than its virtual address known to the rest of the system.

The address map 136 of details of the organization and structure of the memory system exits in each initiator agent coupled to an IP core. The memory scheduler 132 schedules pending accesses in a channel-buffer, selecting one access during each DRAM command cycle, sending the appropriate command to the DRAM, and updating the state of the pending access. Note that a single memory access may require as many as three DRAM commands to complete. The memory channel then performs the requested accesses and returns one or more responses with the read data to a buffer. The target agent collects replies from the memory channels so they can be presented to the initiator core in the expected in-order response order.

Thus, the initiator cores 102-114 do not need hardware and software built in to keep track of the memory address structure and organization. The initiator cores 102-114 do not need a priori knowledge of the memory address structure and organization. The memory scheduler 132 has this information and isolates the cores from needing this knowledge. The memory scheduler 132 may receive a request sent by the initiator agent and translate the target address and channel route to rank, bank, row and column address information in the various memory channels/IP cores.

Also, the memory scheduler 132 with configurable address tiling functions supports receiving configurable configuration parameters from a user. The configurable configuration parameters flexibly support a multiple channel configuration that is dynamically changeable and enable a single already-designed System-on-a-Chip design to support a wide range of packaging or printed circuit board-level layout options that use different on-chip or external memory configurations by re-configuring tiling-to-region assignments to better support different modes of operation of a single package.

Figure 2:
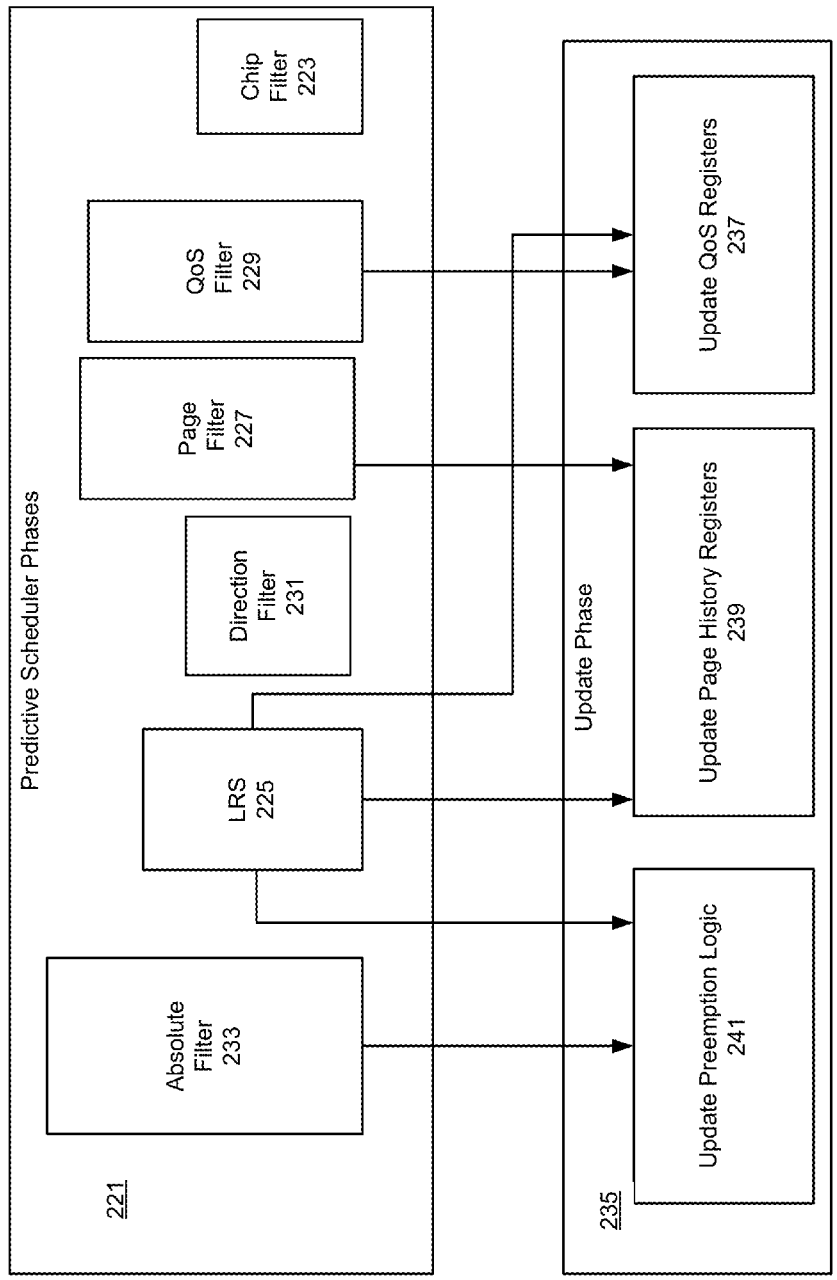
FIG. 2 depicts the high level architecture view of an embodiment of the memory scheduler using a predictive scheduler and a weighted parallel processed arbiter.

FIG. 2 depicts the high level architecture view of an embodiment of the memory scheduler using a predictive scheduler and a weighted parallel processed arbiter. The pipelined arbiter 221 generates an arbitration weight for each thread based on the two or more weighting factors including an absolute filter factor 233, a least recently serviced factor 225, a page-filter factor 227, a Quality of Service (QoS) factor 229, a bus direction filter 231, a same chip filter 223, and other similar factors. The pipelined arbiter 221 processes these weighting factors 223-233 in parallel. The pipelined arbiter 221 splits the scheduling algorithm for arbitrating requests into two cycles namely, a schedule step and an update step. The schedule step of the algorithm applies the filter factors 223-233 that have been enabled. The update step in the predictive scheduler 235 updates the QoS credit counters and QoS states registers 237, page history registers 239, and updates preemption logic 241 after the winner thread has been determined.

The memory scheduler achieves the following major objectives: high operating frequency by incorporating a feature called predictive scheduling and recovery while processing a weighted arbitration factors in parallel. The pipelined arbiter 221 in the memory scheduler arbitrates among multiple incoming Sys threads and assigns one winner, which then forwards the request on the thread to the memory interface. The arbitration is performed by employing a set of filters 223-233 which trade-off QOS requirements of the threads and the utilization of the underlying DRAM. The memory scheduler schedules a winner thread every clock cycle but the recovery mechanism may affect one of the winning threads.

Figure 3:
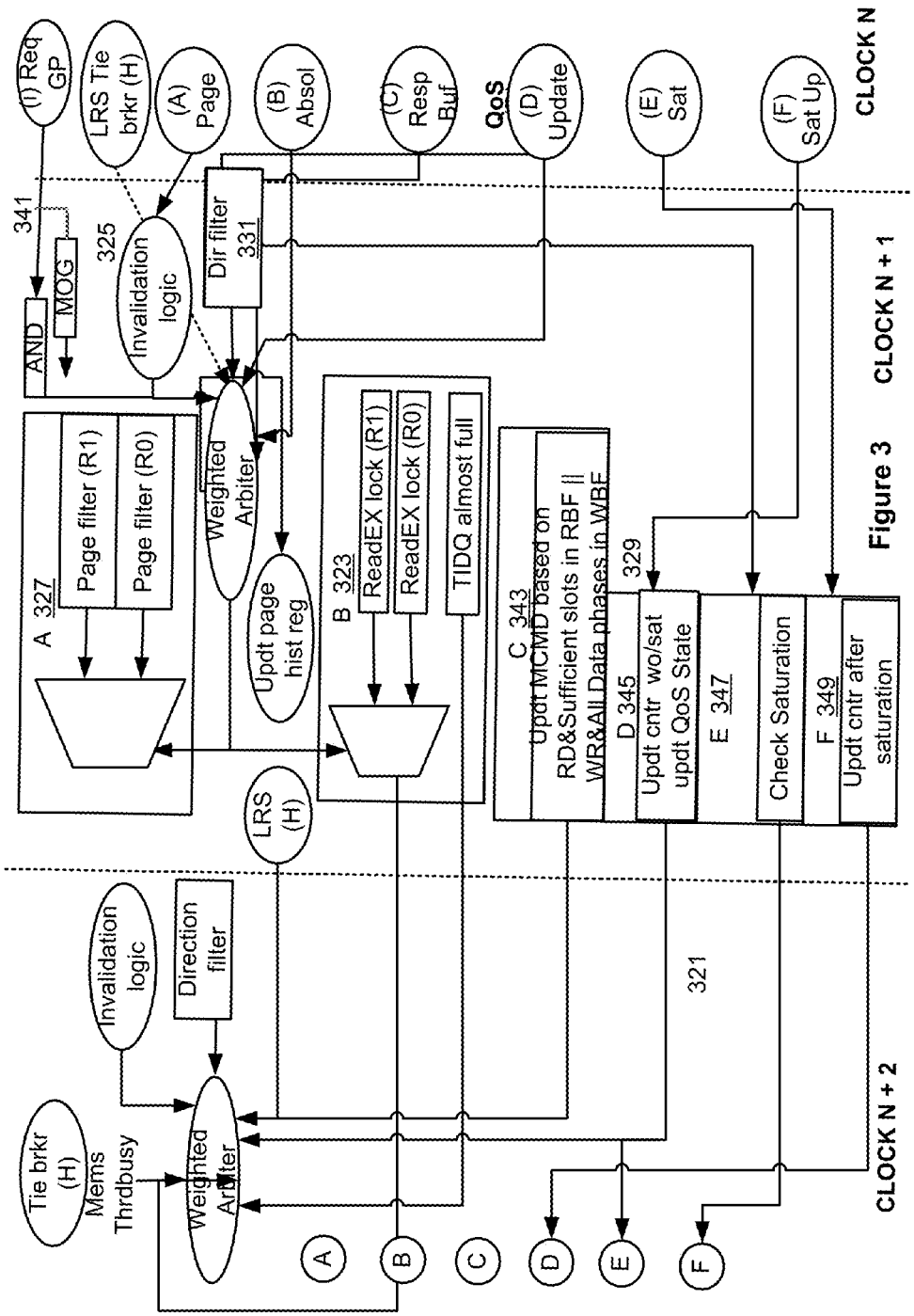
FIG. 3 depicts a lower level architectural view of an embodiment of the memory scheduler using a predictive scheduler and a weighted parallel processed arbiter.

FIG. 3 depicts a lower level architectural view of an embodiment of the memory scheduler using a predictive scheduler and a weighted parallel processed arbiter.

The memory scheduler has a pipelined arbiter 321 to determine which request will access the target memory core. The pipelining occurs in stages within the arbiter 321 over a period of more than one clock cycle. The pipelined arbiter 321 uses the two or more weighting factors to make the arbitration decision. The arbiter 321 generates an arbitration weight for each thread based on the two or more weighting factors including an absolute filter factor 323, a least recently serviced factor 325, a response valid factor 343, a page-filter factor 327, a Quality of Service (QoS) factor 329, and other similar factors.

Each dotted vertical line denotes a clock boundary. The figure depicts a snapshot of three clock cycles denoted by clock N, clock N+1 and clock N+2, respectively. Most of the details are presented in clock N+1, and they can be correlated to the previous and next clock by matching the labels (A through H). From the time a request of a given thread arrives at the input to the pipelined weighted parallel arbiter 321 to the first time a final decision is made on that request in clock cycle N+2, whether or not it will win the arbitration among other requests at the arbitrator, takes more than one clock cycle while the pipeline line of the arbiter computes some of the dependencies associated with that inputted request. The predictive scheduler uses one cycle older information to obtain the winner thread, and recovers from a wrong prediction within one cycle. The following is the summary of each of the blocks.

Block A: This block describes the page filter 327. The page-filter factor 327 gives more value to threads that have requests that are page hits over those requests that are page misses by comparing a first bank and page address of a current request with a second bank and page address open in the DRAM during a previous cycle. The page filter 327 is calculated for a request in R1 and a request in R0 (refer to FIG. 6). In the figure, the page filter for thread-0 is presented. If the thread is a winner, the request in R0 will be accepted and in the next cycle, request in R1 will be forwarded to R0. Hence, the page filter associated with the request in R1 is used in the next cycle. On the other hand, if the thread is not a winner, the page filter associated with request in R0 is used in the next cycle.

Block B: The block describes part of the absolute filter 323. This absolute filter factor 323 is configured to remove all threads that do not have a valid request from arbitration. The top part of the block depicts the READEX lock check. Again, the check is performed for the request at R0 as well as R1, and depending on whether the thread is a winner or not, the corresponding result is used in the next cycle. The bottom part of the block pertains to checking if the Thread ID Queue is almost full. As mentioned before, since the check is done one cycle earlier, we have to take a conservative approach and check if it is almost full (occupancy=size−1).

Block C: The block describes part of the response valid factor 343. The predictive scheduler has valid request detection logic 343 to check for sufficient space in a response buffer to hold the responses of a read request and overrides the request to be idle if there is not enough space in the response buffers. Also, the response valid factor 343, in the case of a write request, if all the data phases are not available, again, overrides the request to be idle. The response valid determination is performed on one cycle older values when evaluating the write request or the read request in the current clock cycle. Thus, the memory scheduler modifies the valid request detection logic to operate on one cycle older values.

Blocks D, E, and F pertain to the QoS factor 329. The QoS factor 329 associated with each thread filter that has logic configured to let a thread go through and be a candidate for arbitration if there is no other thread whose current QoS level is higher than this thread. The Quality of Service (QoS) factor includes QoS update logic consisting of rate counter logic 345 to compute and update values of all the threads in credit counters while saturation logic 347, 349 takes each thread's saturation values into account, and the QoS update logic is not in the critical path. Block D, the rate counter logic 345, updates the counter and the QoS mode without taking the saturation values into account. Block E, saturation logic 347, checks for saturation. Block F, saturation logic 347, adjusts the counter values based on the saturation values. As described in the QoS optimization section below, the steps of these three blocks form three stages of a pipeline. Hence, while the QoS is updated one cycle earlier, the saturation logic takes additional two cycles.

Block H pertains to the least recently serviced filter factor 325. After all the above filters are applied, the least recently serviced filter 325 applies a least recently serviced algorithm to choose among the remaining threads. The least recently serviced filter denotes the tie breaker which is LRS, bandwidth (BW), or weighted round robin, based on the QoS mode of the thread.

Block I pertains to preemption logic 341. The arbiter also has request grouping logic 341 to prevent a thread from getting preempted until a user configurable number of requests in a group has been serviced; thereby, causing a first thread with a request in the middle of the group cannot be preempted by another thread with a higher QoS until the configurable number of requests has been matched or exceeded when the arbiter has already awarded arbitration to a first request in that group from the first thread. The user configurable number of requests is configurable at runtime. The request grouping logic 341 is meant to ensure that if the request was invalid on a thread in clock N, the middle_of_group (MOG) bit is set to 0 in the next clock cycle.

The direction filter 331 includes a bus direction filter and a chip direction filter. The bus direction filter factor gives more value to threads that have requests that are in the same bus direction as the previous request for the last cycle. The same chip filter factor gives more value to threads that have requests that are to the same memory chip as the previous request for the last cycle.

Figure 4:
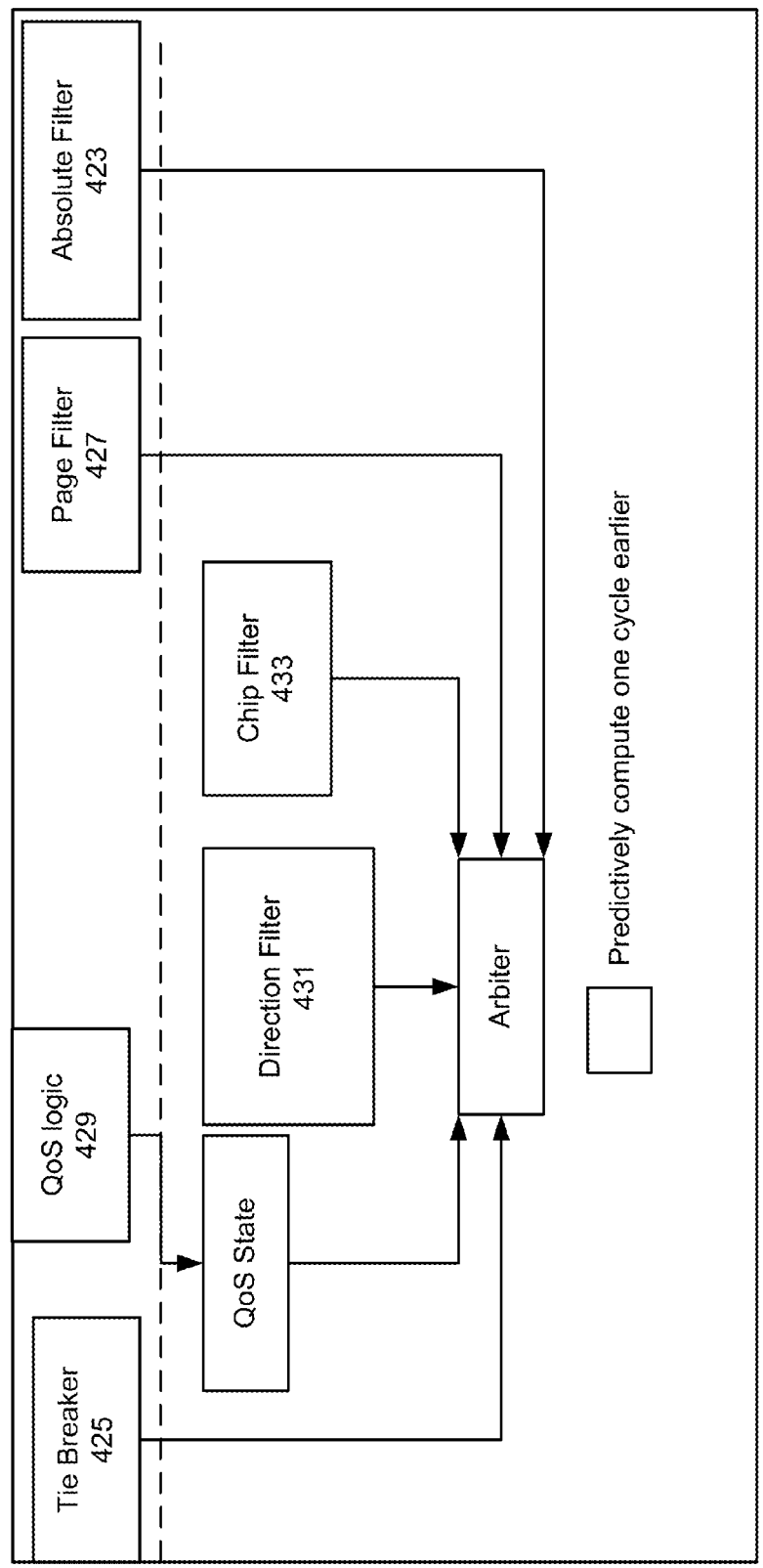
FIG. 4 illustrates a block diagram of an embodiment of the pipelined arbiter having two or more factors affecting the arbitration decision to be processed in parallel.

FIG. 4 illustrates a block diagram of an embodiment of the pipelined arbiter having two or more factors affecting the arbitration decision to be processed in parallel. The pipelined arbiter 421 allows the memory scheduler to operate at higher frequency, with the memory utilization and per thread QoS requirements of individual threads not being compromised.

The dotted line in the figure denotes a clock boundary. The absolute filter 423, the page filter 427, and QoS logic 429 have been pipelined, and evaluated in the previous clock cycle. The memory scheduler may apply the following filters to select the winner thread.

As discussed, the absolute filter 423 removes all threads that do not have a valid request. The absolute filter 423 is also pipelined such that it can be evaluated in the previous clock cycle.

The page filter with preemption logic 427 selects a subset of incoming threads based on the page policy being applied. The page filter 427 is also pipelined such that a page status of a request is determined in the previous cycle.

The QoS filter logic 429 selects threads based on the priority mode. One or more flip flop transistors in the QoS update unit allows the predictive scheduler to works with one cycle older QoS values.

The bus direction filter 431 prefers requests that are in the same bus direction.

The same chip filter 433 prefers requests that are to the same chip.

The LRS filter 425 applies a least recently serviced algorithm to choose among the threads.

Figure 11:
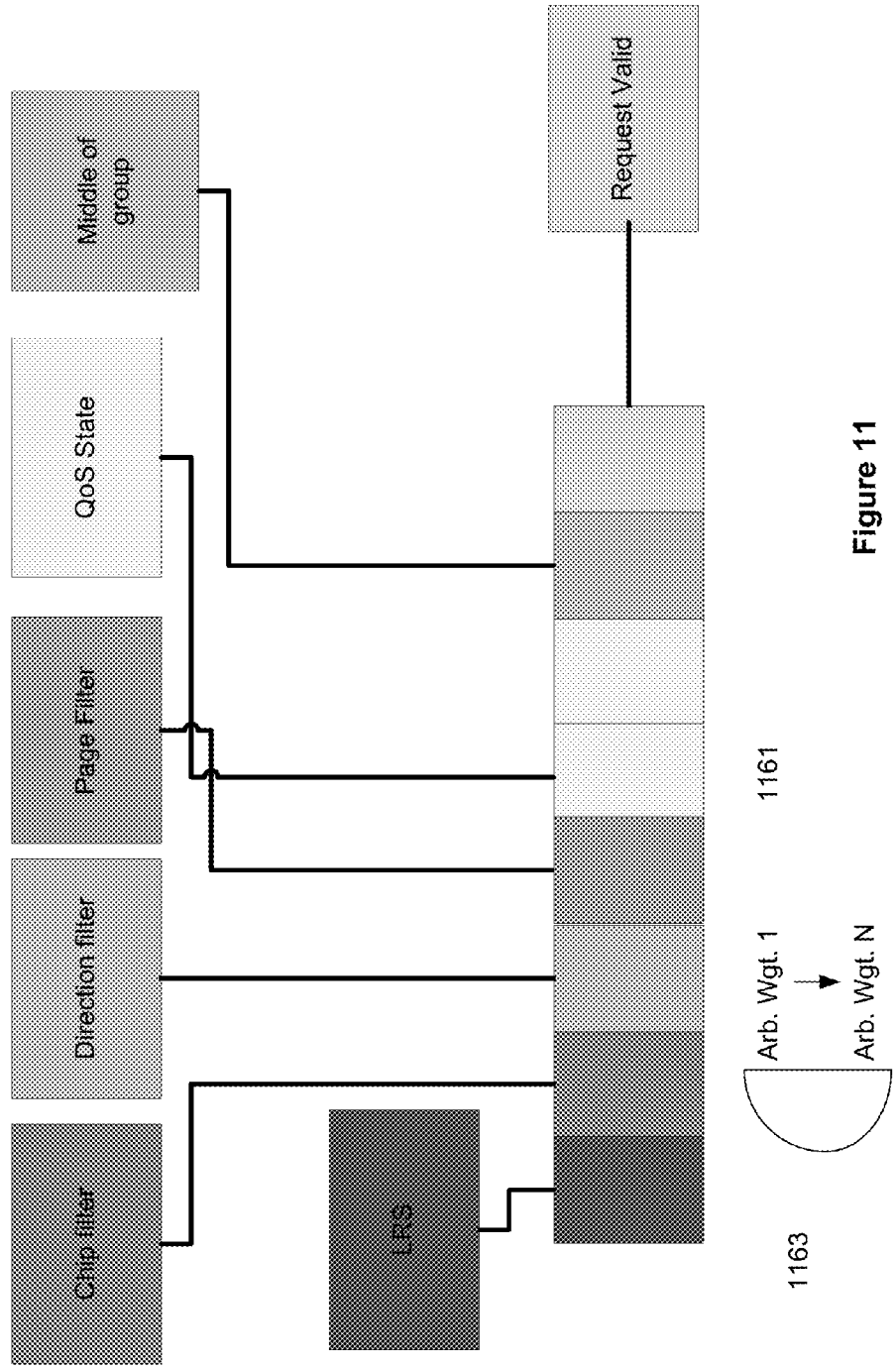
FIG. 11 illustrates a diagram of an embodiment of the weighted arbiter using an arbitration weight of a thread during the arbitration process.

Note that the filters above are applied in parallel and with a scheduling scheme that operates on a weighted arbiter based technique (See FIG. 11 for a arbitration weight expressed as an integer).

Absolute Filter

More specifically, the absolute filter 423 decides if a request at the head of the thread can be a candidate in the current scheduling cycle. The absolute filter 423 applies the following conditions to evaluate if the thread is valid or not. If any of the conditions holds true, the request is deemed invalid.

Request is a read, and the read data buffer does not have Mem MBurstLength number of free slots
  Most DRAM controllers do not have enough FIFO depth to store the read responses. Therefore, in order to ensure that the read responses can be accepted, The memory scheduler schedules a read request only if there is enough space in the response buffer to hold all the responses.
  The memory scheduler does not further chop the request if there are not enough read data buffer slots available Request is a write, and the write data buffer does not have Mem MBurstLength write data words for the request.
  The memory scheduler ensures that after scheduling a write request, all the data phases are available in consecutive clock cycles. In other words, if a write request was scheduled in clock N, and the first data phase of the request started at clock N+M, the last data phase should start at N+M+Mem BurstLength−1. Therefore, the memory scheduler chops the Sys request into a Mem request only after all the data phases of the Mem request are already available in the data buffers.
  The memory scheduler does not further chop the request if all write phases are not available.

Request is a write, Mem OCP reqdata_together is enabled, and SDataThreadbusy is asserted at the Mem OCP interface.
  The memory scheduler cannot send the request until the SDataThreadbusy signal has been de-asserted. Hence, the memory scheduler does not further chop the request until SDataThreadbusy is de-asserted.

Request is a page miss and bank busy flag is asserted
  A bank busy flag is usually asserted when the bank is undergoing a refresh or a pre-charge. In order to avoid multiple back to back pre-charges, The memory scheduler does not issue page miss requests to banks that have bank busy asserted.

The TIDQ (RTIDQ for Read and WTIDQ for Write) which stores the thread ID of the scheduled requests is full.
  The memory scheduler has finite sizes for the TIDQs. The TIDQ is used to store thread ID of the scheduled request, so that the appropriate thread of the read and write buffers can be used for response phase and data phase, respectively.

A configuration read is scheduled, but response has not been received, or a configuration write has been scheduled, but the data phase has not completed.

The interface between the scheduler and the configuration registers resembles a blocking OCP interface. On scheduling the configuration register request, The memory scheduler stops scheduling any other request, and waits until the configuration register access is completed before proceeding to schedule the next Mem request.

The memory scheduler does not chop the request if a configuration register has been scheduled and its response phase has not completed.

The request to the address is locked due to ReadEX.

The memory scheduler may support merely one outstanding lock. If a lock to an address is already in place, the behavior of The memory scheduler when another ReadEx request arrives is not defined.

SThreadBusy is asserted from the Mem OCP interface

Page Filter with Preemption

The page-filter 427 prefers threads that have requests that are page hits over those that are page misses. However, the page-filter 427 makes exceptions based on the priority of the threads and applies preemption logic to keep a thread as a candidate even if it is a page miss. Determining the override due to page preemption consists of the following:

If page_preempt_count number of accesses have been preempted in order to keep the page open, or, page_idle_count number of cycles have passed since the page was opened and no accesses were scheduled on the page, the incoming thread is a candidate if the current QoS state of the thread is equal to the QoS (at the time of opening) of the last thread that opened the page.

If the thread has a strictly higher priority than the last thread that opened the page, the thread is a candidate.

The predictive scheduler uses the previous clock cycle information of one cycle older bank and page address information to determine whether a page hit will occur when making a determination on the current clock cycle's request's page hit determination by comparing a first bank and page address of a current request with a second bank and page address open in the DRAM during the previous clock cycle. The predictive scheduling is based on trying to get a page hit with the request using the open page in the memory in the current cycle. The predictive scheduler uses older/previous cycle information on whether a page hit will occur, when making the determination on the current cycle's request's page hit determination. The predictive scheduler eliminates the page hit look up and/or calculation from occurring in the current arbitration cycle and allows the page hit up and/or calculation to occur during the previous clock cycle.

QoS Filter

The memory scheduler applies QoS logic mechanisms 429 to differentiate between priority, controlled bandwidth and best effort threads, and achieves a graceful trade-off between high memory efficiency requirements and low latency requirements of priority threads.

The memory scheduler may support three or more QoS modes that are used during arbitration. A thread can programmed to be 1) best effort (QOSMODE=0), 2) bandwidth allocated (QOSMODE=1) or 3) priority (QOSMODE=2). Best effort threads have the least service rate and get voted out whenever a bandwidth or a priority thread is in contention. The bandwidth threads have the next level of priority, and can be preempted by a priority thread. Finally, priority threads have absolute priority.

The QoS filter 429 lets a thread go through and be a candidate for the next stage if there is no other thread whose current QoS level is higher than this thread. The QoS level of the threads is calculated during the QoS update stage.

The predictive scheduler also references an amount of QoS allotted credits already used for that thread stored in counter and compares the amount already used to a limit on allotted credits for that thread when making a determination on the current clock cycle request's QoS state. The amount of QoS allotted credits already used is based on the previous clock cycle information of one cycle older QoS mode values rather than on the current clock cycle information. The predictive scheduler updates the QoS and page hit information in queues holding this information for a decision on the current arbitration cycle in the next cycle and thereby makes the calculation one cycle earlier than when the decision is made.

The QoS modes of the threads dynamically alternate between best effort modes and their programmed modes (BW or Priority). The transition between the modes is controlled by a credit count value, which is a measure of whether the thread is over-serviced, under-serviced, or serviced exactly in accordance with its request. If the credit count of a thread evaluates to a positive value, it indicates that the thread is not serviced enough, and should be given priority. On the other hand, if the expression evaluates to a negative value, it indicates that the thread has been over-serviced. If the credit count is zero, it indicates that the thread has been serviced exactly in accordance with its bandwidth requirements.

When a priority thread has a positive credit_count value, it gets promoted to the priority QoS mode. As long as the thread stays in the priority mode, it gets absolute preference over all other threads. In the case of multiple priority threads, all those threads are maintained as candidates. When a bandwidth thread has a positive credit_count, it gets promoted to the bandwidth qos mode. The thread is serviced if there are no priority threads that are in contention. Again, in the case of multiple bandwidth threads, all those threads are maintained as candidates, and a later filtering stage is used to determine the winner thread.

Accordingly, the memory scheduler eliminates the QoS look up and/or calculation from occurring in the current arbitration cycle and allows the QoS look up and/or calculation to occur during the previous clock cycle. Thus, the memory scheduler provides a graceful tradeoff between latency sensitive traffic and DRAM bandwidth utilization.

Direction and Chip Filters

The direction filter 431 tries to minimize the number of read-to-write and write-to-read direction changes, and thus minimizes the associated overhead. If the request at the head of the thread is of the same direction as that of the last request scheduled by the memory scheduler, then the thread is a candidate. The direction filter 431 avoids causing starvation to other threads by defining a direction count limit. If more than direction-count number of requests are either all reads or all writes, and are scheduled consecutively, the direction filter 431 is disabled until a request with the opposite direction is scheduled. The logic applies direction and chip filter only based on the direction of the request and not on the direction/chip count.

The chip filter 433 is identical to the direction filter, except that the criterion employed is that requests to the same chip are preferred over those to different chips.

LRS Tie Breaker

The Least Recently Serviced (LRS) tie breaker filter 425 is applied at the end to choose a winner thread from all the remaining candidate threads. Among the candidate threads, the LRS algorithm picks the thread that has least recently been serviced.

Figure 5:
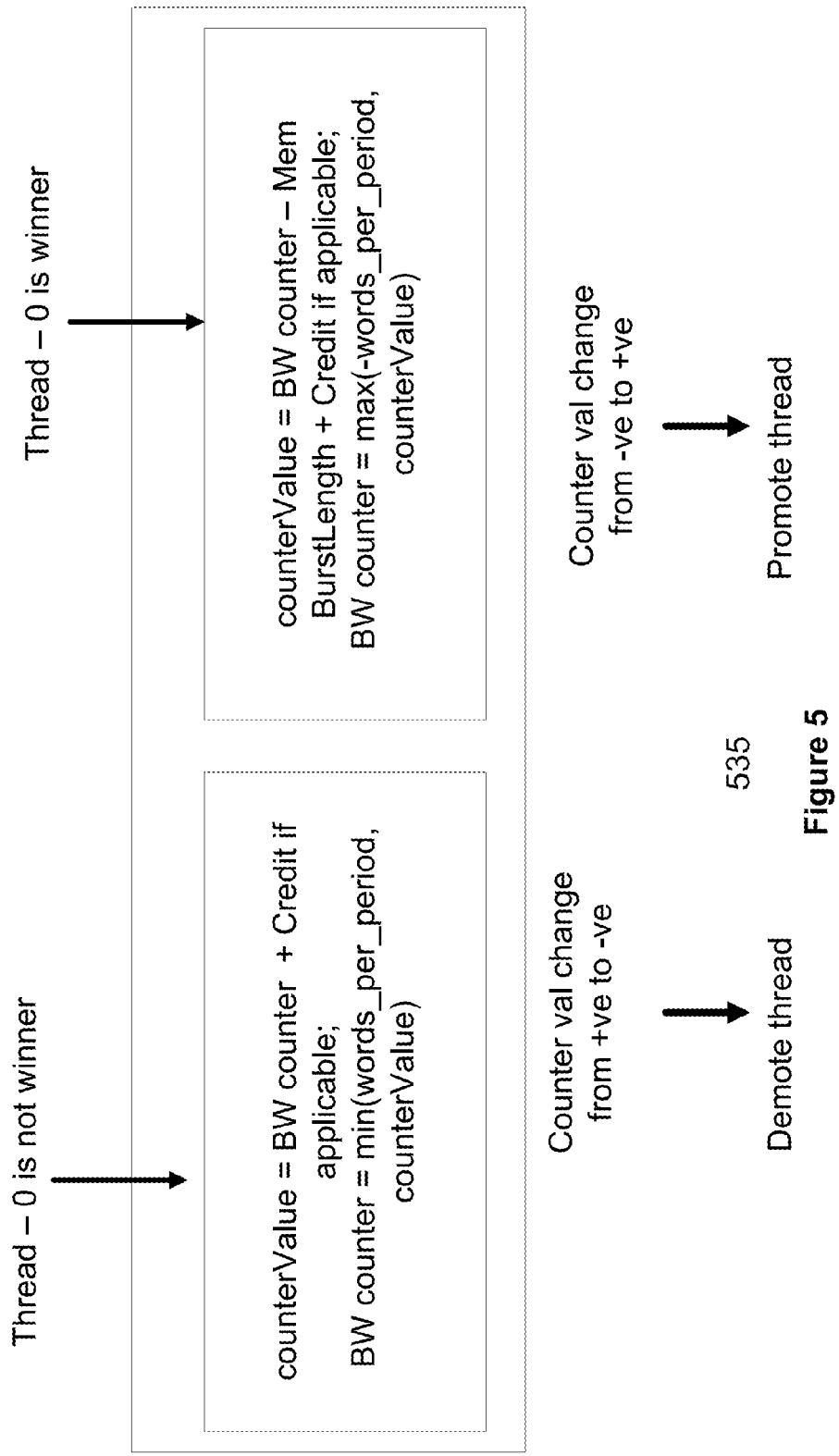
FIG. 5 illustrates a diagram of an embodiment of the predictive phase of the arbitrator.

FIG. 5 illustrates a diagram of an embodiment of the predictive phase of the arbitrator.

Update Phase

In this predictive phase, the predictive scheduler 535 updates its states that are used in the next cycle for scheduling. The update phase consists of four operations that are performed in parallel. They are: 1) updating the QoS states, 2) updating the page history registers, 3) updating the direction and chip count counters, and 4) updating the preemption count counters.

Update of the QoS States

After the winner thread has been determined, the QoS state of each of the threads is updated. If the thread is a winner thread, the left part of FIG. 5 is followed, where the bandwidth counter value of the thread is decremented by its Mem MBurstlength. Regardless of whether the thread is a winner or not, it accumulates one credit every N cycles, where N is programmed per thread by the user. The evaluated values are upper bounded at the positive value of the thread's words_per_period setting, and lower bounded at the negative value of the thread's words_per_period setting. Finally, if the bandwidth counter value is less than zero, the QoS mode is updated to best-effort, and if it is greater than or equal to zero, the QoS mode is updated to the thread's programmed bandwidth.

Updating Page History Registers

The predictive scheduler 535 also updates the page history registers. Based on the bank to which the scheduled request is targeted, the register is updated with the current value of the open page in that bank.

Updating the Direction and Chip Count Counters

The direction and chip count counters are incremented by 1 for the corresponding direction and chip of the request if the request is in the same direction or chip respectively. Otherwise, they are reset to 1. If either the direction count limit or the chip count limit is reached, the direction filter is disabled for the next scheduling cycle.

Updating the Preemption Count Counters

If the winner request is a page hit, the preemption counter of the request's bank is incremented by 1 if it is less than the programmed page_preempt_count value. If the winner request is a page miss, the counter is reset to 1. At every cycle, the page idle counter for the request's bank is reset to 0 if a request is sent to the bank. Otherwise, the counter is incremented by 1 if it is less than the programmed page_idle_count value of the thread.

Figure 6:
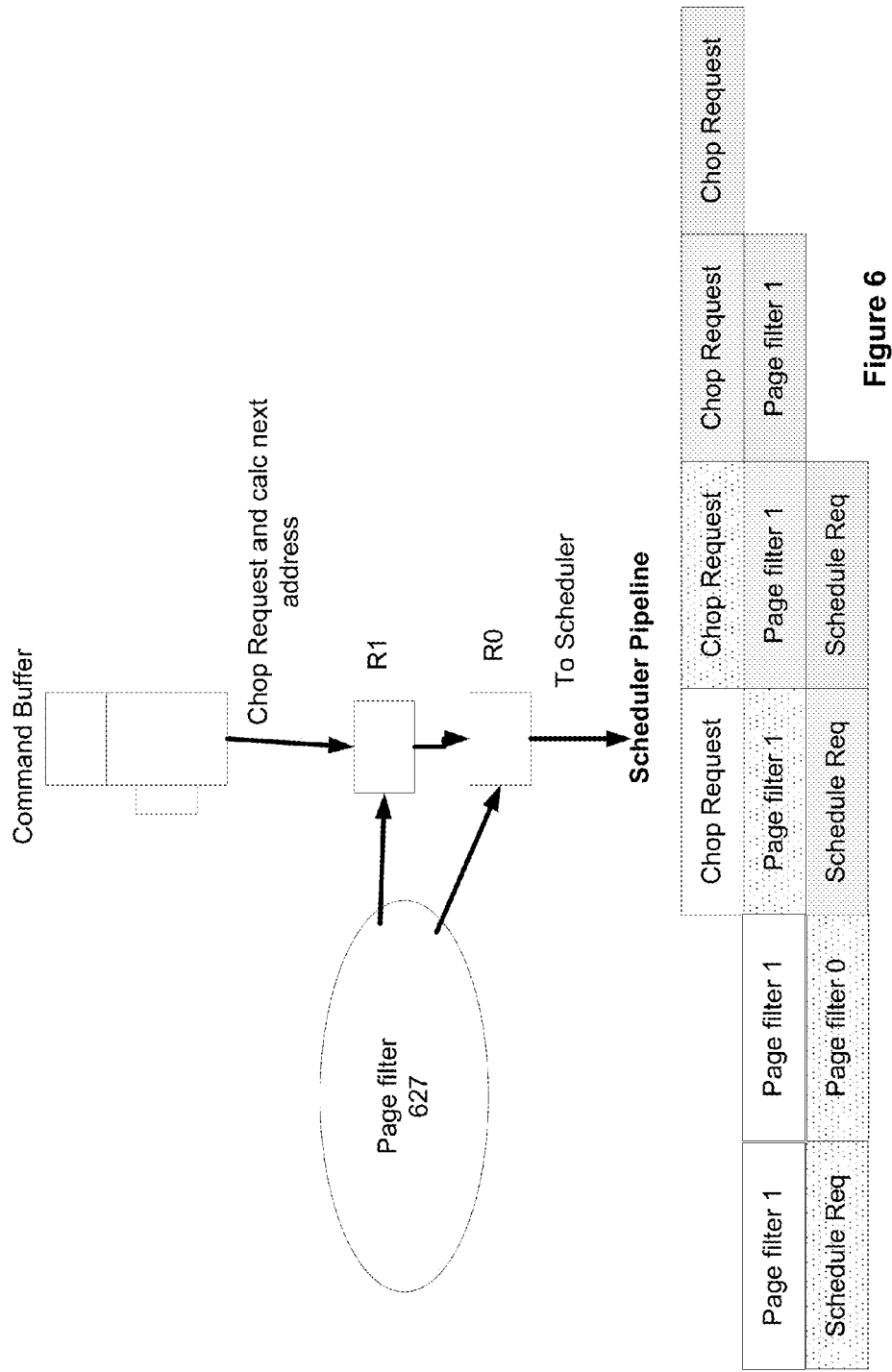
FIG. 6 depicts a diagram of an embodiment of the pipelined page filter calculation.

FIG. 6 depicts a diagram of an embodiment of the pipelined page filter calculation.

The page filter 627 consists of comparing the bank and page address of the request with the current open bank and page address which in the memory scheduler's view, is open in the DRAM. The page filter makes this determination with a page hit/miss calculation. The preemption logic is not included in this section. The predictive computation of the page filter occurs so that the computation can be moved to the previous cycle and can be done in parallel with the arbitration logic. The predictive calculation of page hit is based on the assumption that it is very rare for a different thread to open a page needed by a given thread. In other words, if a "different" thread accesses the bank that a given thread wants to access, it will most probably result in a page miss for the given thread.

The worst performance degrading case based on the predictive scheduler would be as follows: Say thread one (T1) has requests R1 and R2 going to bank 0, page 0 and bank 0, page 1 respectively. Thread T2 has requests R3 and R4 going to bank 0, page 0 and bank 0, page 1 respectively. Also assume that thread T3 has a pending request which is a page miss (bank 0, page 2). If T1 is scheduled, in the next cycle, the scheduler will incorrectly mark T2 (request R3) as a page miss. So, it may schedule T3, assuming a LRS behavior. Then, T2 will get scheduled, which is again a page miss, and then T1 gets scheduled, resulting in a page miss, and the cycle repeats. If the memory scheduler had not used the predictive scheduler, the order of scheduling would have been T1 (Hit), T2 (Hit), T3 (Miss), T1 (Miss), T2 (Hit), T3 (Miss).

The following rules should be applied to calculate whether a page is a hit or a miss:

1. The page hit/miss calculation is performed for the thread the result of which will be used in the next schedule cycle. In effect, the memory scheduler has pipelined the page hit/miss calculation.

2. Assume that the request has a thread ID 0. If in any cycle, the memory scheduler schedules a request from a different thread that accesses the same bank as thread 0, the request on thread 0 is tagged as a page miss. For the subsequent cycles, the page hit/miss calculation proceeds as usual. However, the page hit/miss calculation from the previous cycle is used to when determining the winner thread in the current cycle.

3. In order to achieve the timing closure, a flop is inserted between request chopping and page filter. If the request in R1 and request in R0 go to the same bank, the page status of R1 is updated with status calculated by comparing the addresses of the two requests. On the other hand, if the requests go to different banks or there is no pending request on the thread to be scheduled (or the request is invalid), the page status of R1 is updated with the status calculated by comparing the bank and page of the request with the current open page. The page status of R0 is updated every cycle by comparing its address to the current open page. If a request in R0 is scheduled in cycle N, in cycle N+1, the page status of the thread is assigned to be the status calculated at R1. Assuming that the next request on the thread was scheduled in cycle N+M, for cycles N+2 through N+M, the page status of the thread is assigned to be the status calculated at R0 in cycles N+1 through N+M−1, respectively.

The page filter 627 selects a subset of incoming threads based on the page policy being applied. The page filter 627 uses predicted values of page filter and applies a recovery mechanism in the case of a wrong prediction. Thus, the page filter is pipelined such that a page status of a request is determined in the previous cycle by comparing the bank and page address of the request with the current open bank and page address in the DRAM. The page hit/miss calculation from the previous cycle is used to when determining the winner thread in the current cycle.

The bottom part of FIG. 6 depicts an example of the pipeline with the page filter 627. Each block in the top row in the figure depicts a different chopped request. In the illustration, the shaded third request causes a bubble as it was not scheduled in the cycle immediately after chopping.

Figure 7:
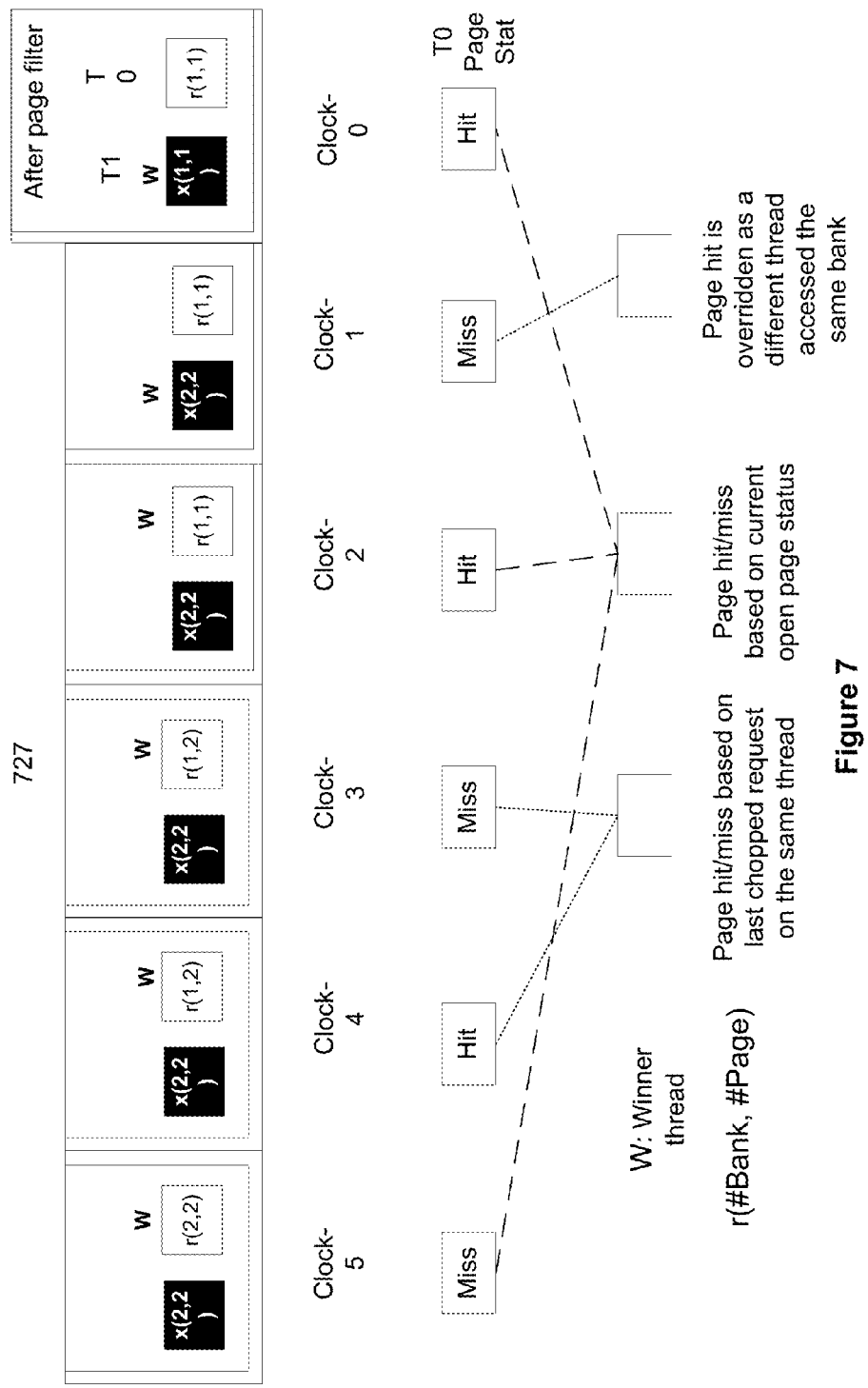
FIG. 7 illustrates a diagram of an embodiment of the pipelined page filter.

FIG. 7 illustrates a diagram of an embodiment of the pipelined page filter. The application of page filter 727 on an example with two threads T0 and T1 is depicted in FIG. 7. The figure depicts the state of the register holding the chopped request (Register R0) at different clock cycles (clock-0 through clock-5) and the corresponding page hit/miss status for thread T0 at the different clock cycles. The page status blocks have dotted lines to the different conditions based on which the status was computed. The first block represents the fact that the thread's page hit status was nullified as another thread accessed the same bank, the second block represents the fact that the page status of the thread was calculated based on the current open page, and the third block represents the fact that the page status of the thread was calculated based on the last chopped request on the thread.

Assume that the current open page at the beginning of clock-0 is 1 in bank 1. At clock cycle 0, the request in thread T0 is a candidate, and its page status is "hit". In clock cycle 0, thread T1 was scheduled, with a request to bank-1, and row-1. At the same time, in clock cycle 0, the page status of T0 was evaluated as a hit because the current open page is row-1 on bank-1. However, in clock cycle 1, page hit status was invalidated as a different thread T1 accessed the same bank. In clock cycle 1, the page status is calculated again and updated to a hit, which is then used to schedule the thread in cycle 2. Since the thread was scheduled in cycle 2, the next chopped request arrives at the register (from register R1 to R0). In this case, the request and the last chopped request go to the same bank (bank-1), but different pages. Hence, the request is tagged as a page miss. In clock cycle 4, the two requests go to the same bank and same page, and hence, the page status is updated to be a hit. Finally, in clock 5, the chopped request goes to bank-2, and the last chopped request goes to bank-1. Hence, the page status is updated based on the current open page in bank-2, which happens to be a hit in this case.

Finally, when there is no pending request at R0, the chopped request should bypass R1 and go to R0. In this case, the request should be tagged as a page miss. This way, the minimum structural latency on The memory scheduler can be kept the same as it is currently. During regular operation, when request goes to R1 and then R0, the latency in the memory scheduler is increased by 1 cycle.

Page Preemption Logic

The memory scheduler employs a page preemption logic. The memory scheduler incorporates a feature called request grouping, by which it can minimize page thrashing in the DRAM memory. The application of request grouping logic prevents a thread from getting preempted until a user configurable number of requests in the group have been serviced. The memory scheduler also uses a request grouping scheme to achieve better trade-off between latency and bandwidth. The request grouping helps to avoid back to back page misses. A thread is denoted as being in the middle of the group if it has already scheduled the first request in that group. A thread with a request in the middle of a group cannot be preempted.

A per thread register field "request_group_size" is introduced that specifies the number of Mem requests that are grouped together. When set to a number N, The memory scheduler schedules N+1 Mem requests consecutively from the same thread if the thread can send a request to the Mem interface if scheduled. The N+1 Mem requests on the thread form a group. A new group is started under the following conditions:

In the previous cycle, the request on the thread was not valid or no Mem requests were available to be scheduled, and in the current cycle, a valid request is waiting.

Thus, in the previous cycle, the request was not scheduled due to one or more of the following cases were true: i) The request was a page miss and the corresponding bank busy flag was high, ii) the request was a write and not all write data phases were available, iii) the request was a read and the response buffers did not have space for the responses, and iv) request was a write and Mem OCP reqdata_together was enabled, and Mem OCP SDataThreadbusy was high.

In this case, when the request is scheduled, it will form the first request of a group for the thread.

A new Sys transaction always forms a start of a group.

Thus, REQUEST_GROUP_SIZE is a per thread parameter. Its corresponding register field, request_group_size can be programmed at design time or runtime. When set to a number N, The memory scheduler schedules N+1 Mem requests consecutively from the same thread, if valid requests are available on the thread. The N Mem requests on the thread form a group. A new group is started under the following conditions:

A thread is denoted as being in the middle of the group if it has already scheduled the first request in that group. Otherwise, the thread is not in the middle of the group. A thread with a request in the middle of a group cannot be preempted. However, a thread can be preempted at group boundaries (i.e., before the first request of a group is issued). By default, the request_group_size parameter is set to 0, indicating that the request is never in the middle of a group. The "middle of group" logic overrides the QoS mode of the thread. In effect, it ensures that even if a thread with elevated QoS requirements is waiting, it does not get serviced until the group of requests for the thread in progress has completed.

Figure 8:
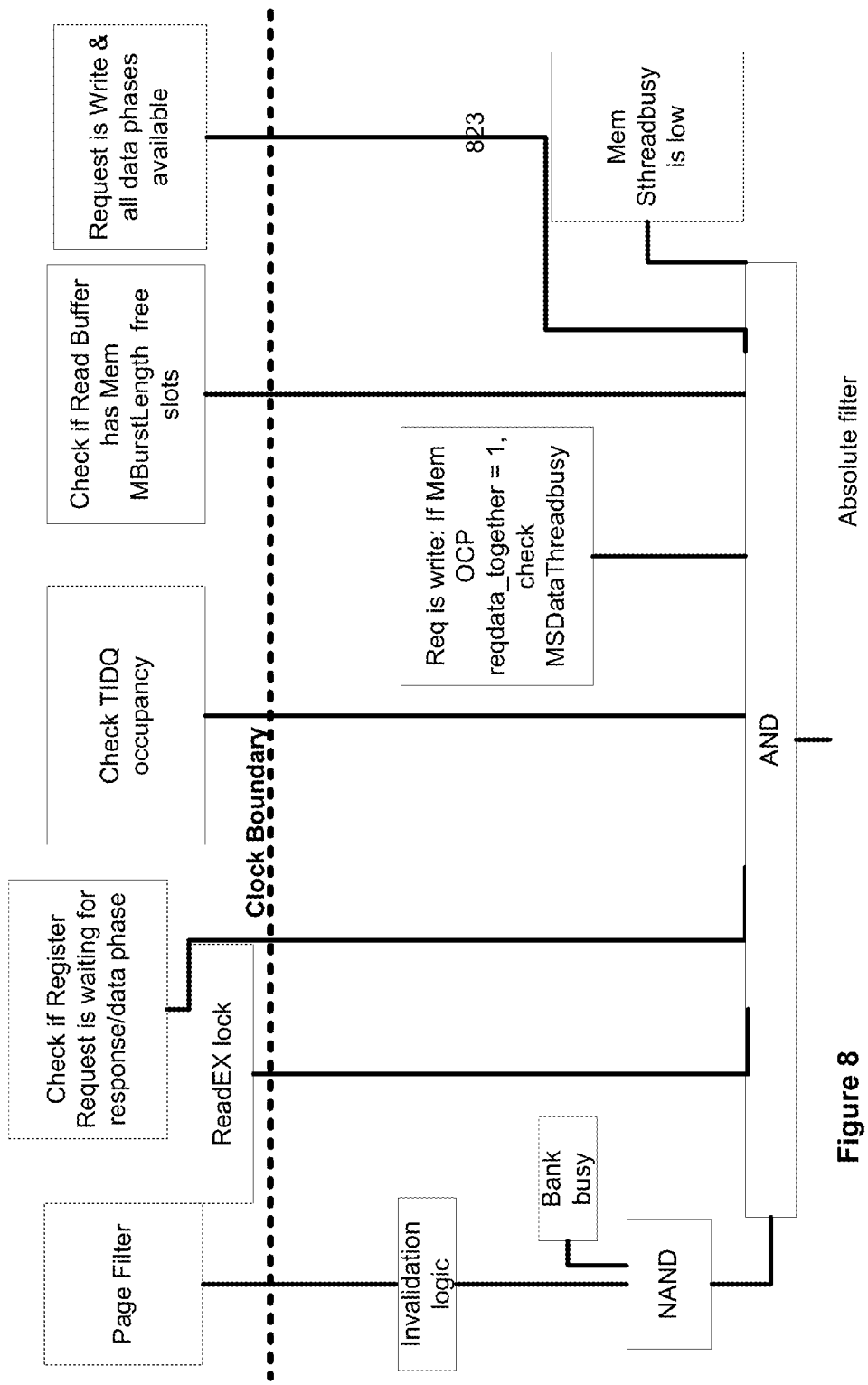
FIG. 8 illustrates a diagram of an embodiment of the pipelined absolute filter.

FIG. 8 illustrates a diagram of an embodiment of the pipelined absolute filter. Another timing bottleneck faced by the memory scheduler is the calculation of the absolute filter 823. The absolute filter 823 has been described previously in the section discussing the memory scheduler scheduling operation. The memory scheduler attempts to minimize the effect of the absolute filter on timing closure as figuratively explained in FIG. 8. As shown in the figure, certain evaluations are done in the previous cycle, so that they can be removed from the timing path.

Since the READEX lock logic has to compare entire addresses, it consumes a significant number of gates. Therefore, it is advisable to remove this logic from the critical path as well. Similar to the page filter, the lock is checked against the address in R1, as well as R0. Since READEX lock is checked one clock cycle earlier, if a READEX is scheduled, no scheduling takes place in the next clock cycle, resulting in an idle cycle. Since the memory scheduler makes the decision on READEX in the previous cycle, the minimum latency of a request is increased by one. At the same time, an extra clock cycle is also lost after the clearing write has been scheduled.

When READEX is enabled in the Mem OCP interface, a request cannot bypass register R1. Hence, the minimum structural latency of The memory scheduler is increased by one.

No definition may exist for handling multiple outstanding READEX commands, and thus the memory scheduler merely works with merely one lock filter. If another READEX command arrives when there is already an outstanding READEX (an address has been locked by a previous READEX command, and the corresponding clearing write has not arrived), the memory scheduler internally sends error responses for the READEX request, indicating that the READEX cannot be serviced.

A check for sufficient space in the response buffer is performed in parallel with page filter operation. Due to the page filter changes, note that the memory scheduler inserts a flop between request chopping and page filter, the memory scheduler makes the check for sufficient space in order to ensure correct functionality of the memory scheduler.

Figure 9:
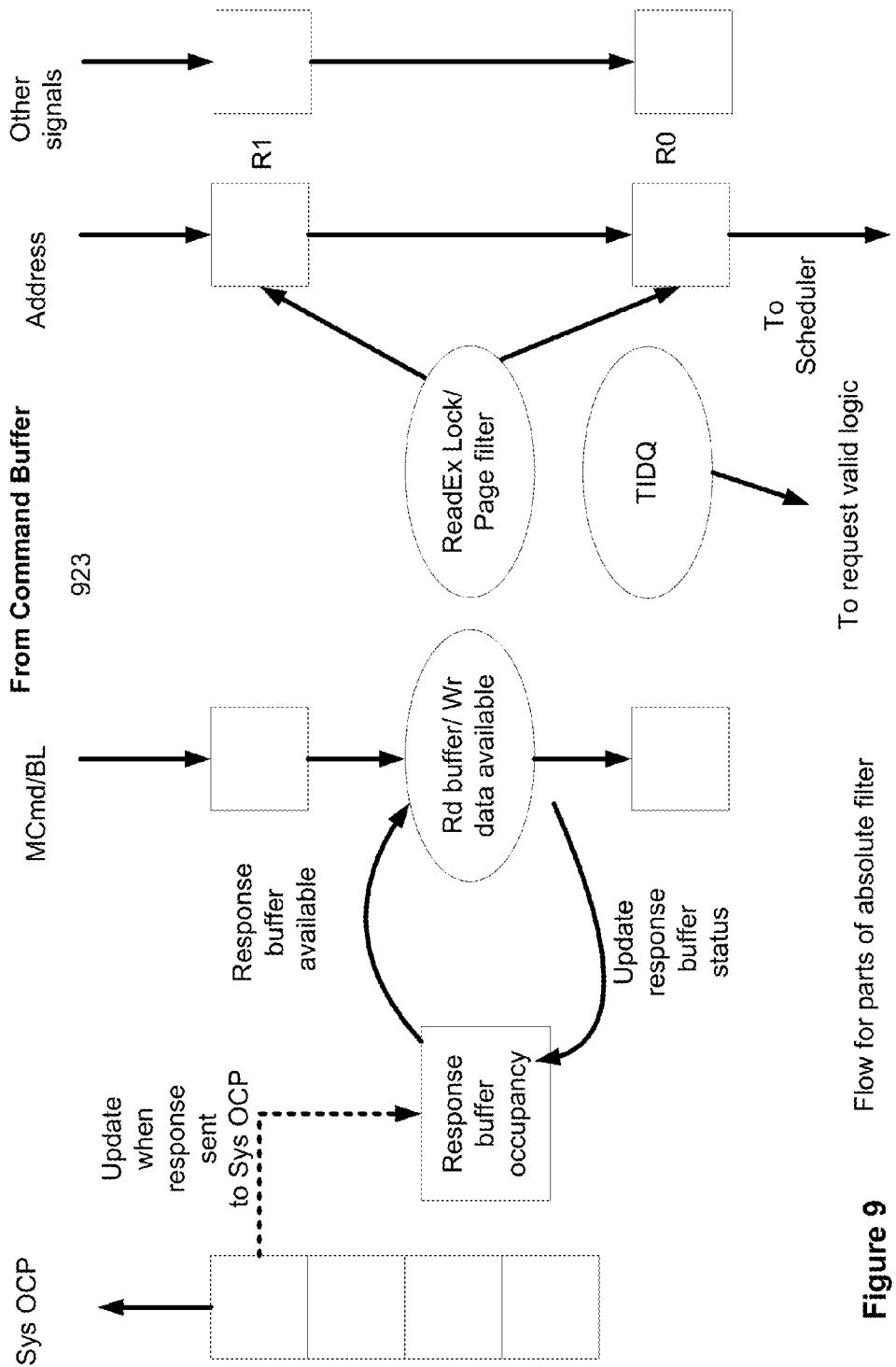
FIG. 9 illustrates a flow diagram for parts of an embodiment of the absolute filter.

FIG. 9 illustrates a flow diagram for parts of an embodiment of the absolute filter. In the absolute filter 923, the MCmd is updated to idle if the request is a read and not enough slots are available in the response buffer, and/or, if request is a write and not all data phases have arrived in the write data buffers. If the request is a read and enough space is available in the response buffer (based on response buffer status), the response buffer status is updated by subtracting the Mem MBurslength of the request to the response buffer status value. The response buffer status is also updated by adding 1 whenever a response is sent out from the response buffer to the Sys OCP. Note that the value of response buffer status is more conservative than the actual occupancy of the response buffer. Whenever a thread is a candidate, the status is updated in anticipation of a response on the thread due to the scheduling of the request.

Figure 10:
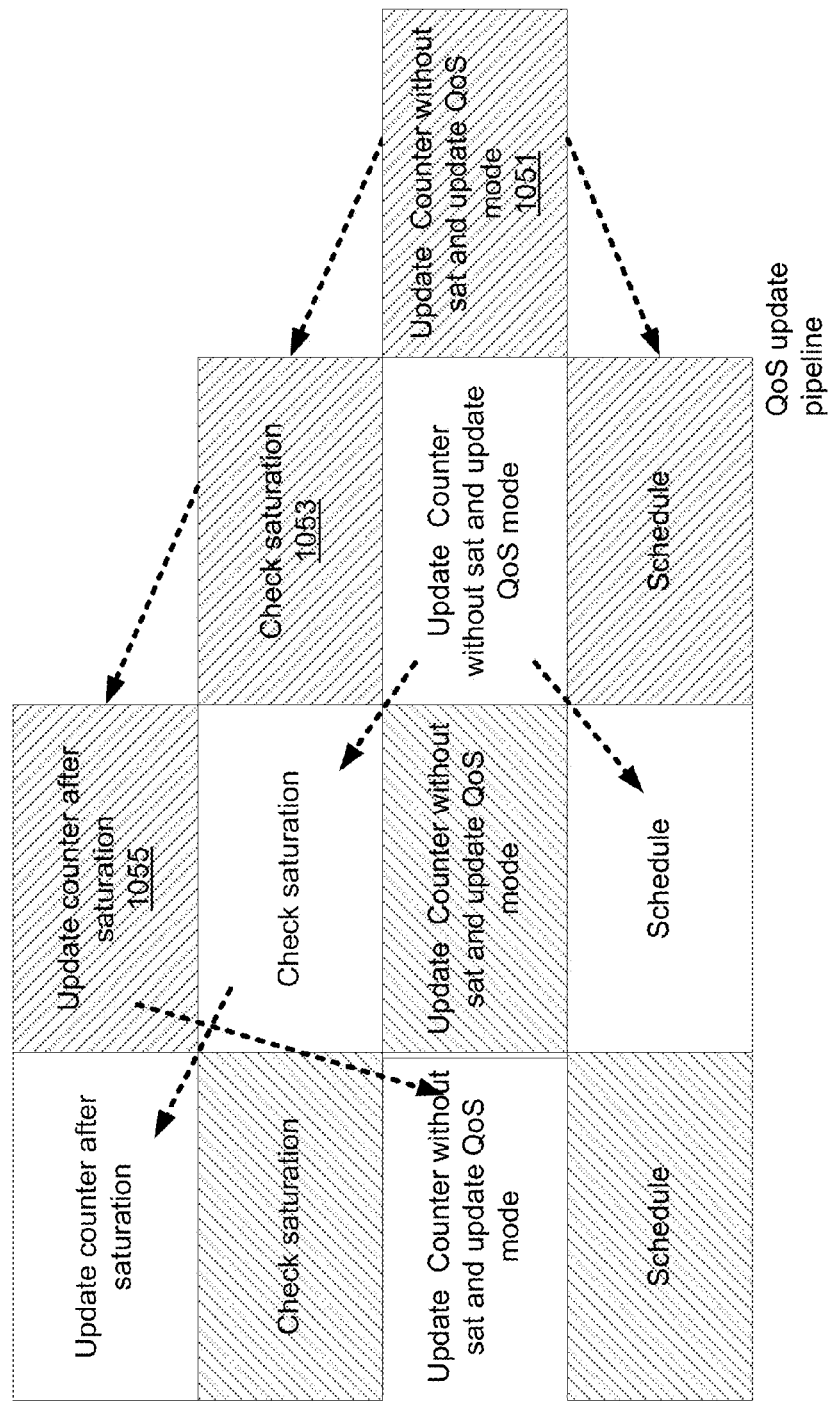
FIG. 10 illustrates a diagram of an embodiment of the pipelined predictive QoS logic.

FIG. 10 illustrates a diagram of an embodiment of the pipelined predictive QoS logic. The QoS update logic 1045 consists of updating the credit counter values of all the threads taking their saturation values into account, followed by updating the QoS states. Using the QoS value from one or two cycles earlier should be acceptable when one considers the overall system performance. Therefore, the logic evaluates the QoS information in three clock cycles. In the first cycle, the rate counter increment logic is computed and the QoS mode is updated. In the second and third cycles, the check for saturation of the counters and the corresponding updates are performed. The complexity of the saturation logic computation forces the predictive scheduler to break it into two cycles. It is performed by adding a flop between the logic that checks if the counter has reached its saturation value (positive and negative), and the adjustment of the credit counter value based on the check.

This pipelined application of the QoS filter is depicted in a timeline fashion in FIG. 10. The horizontal axis in the figure denotes incrementing clock cycles. In this illustration, a four clock cycle window is depicted. The boxes coded in the same hashing or lack of hashing pattern denotes the dependencies (also depicted by arrows). For example, in the first hashed clock cycle, the memory scheduler uses the updated QoS mode from the first QoS update box 1051. The first hashed "check saturation" box 1053 uses the updated counter value from the same yellow box, and the updating of the counter after saturation check 1055 uses the value in the yellow "update counter" box 1051.

FIG. 11 illustrates a diagram of an embodiment of the weighted arbiter using an arbitration weight of a thread during the arbitration process. Instead of evaluating the filters serially, the arbiter generates an arbitration weight 1161 for each thread based on the different arbitration conditions/filter factors.

The memory scheduler uses a filter based scheduling scheme that operates on a weighted arbiter based technique. The arbitration weights 1161 given to different arbiter inputs are user configurable, thus giving the user enhanced control. The pipelined arbiter allows two or more factors affecting the arbitration decision to be processed in parallel and generate a single N number of bit data vector arbitration weight 1161 for that request and then allows that request's arbitration weight 1161 to be compared with all of the other request's arbitration weight to determine which request should win the round of arbitration.

The figure depicts the arbitration weight 1161 for one thread. The arbitration weight 1161 used by the weighted arbiter is composed of a two or more bit wide integer, with bit locations from Least Significant Bit to Most Significant Bit and the weighting factors impart the values for the two or more bit wide integer. The example arbitration weight 1161 is composed of a 8 bit wide integer, and the boxes in the figure denote the bit locations from LSB to MSB. All of the weighting factors are evaluated in a single stage 1163 to generate a winner thread from the arbitration decision, and parallel comparators are used to compare the respective arbitration weights of each thread attempting to win the arbitration decision at the arbiter. The memory scheduler allows a user 1) to specify an order of the weighting factors to be applied in the arbitration weight 1161 as well as 2) remove certain weighting factors from being applied in the arbitration weight 1161 when generating the arbitration weight for each thread based on the different weighting factors. The user can re-order the filters in the arbitration weight 1161, or remove certain filters from the arbitration weight 1161.

Each block in the figure is further explained as follows:

Request Valid: The Request Valid block is set to 1 if the request is valid (if the request passes the absolute filter). Otherwise, it is set to 0.

Page Filter: The page filter block is set to a 1 if the request is targeted to an open page (page hit). Otherwise, it is set to 0.

Middle of group: The middle of group block is set to 1 if the request is not the beginning of a group. It is reset to 0 if the thread does not have a valid request.

QoS state: A two bit value denotes the QoS mode of the thread calculated in the previous cycle Direction and Chip filter: These bits are set to 1 if the direction and chip filter are evaluated to 1 respectively.

LRS: The LRS state is obtained from the existing LRU matrix. It is different for each thread, based on the thread it is getting compared to. For example, if thread 0 was serviced more recently than thread 1, which was serviced more recently than thread 2, the LRS bit of thread 1 is set to 1 when comparing with thread 0, and is set to 0 when comparing with thread 2.

The weighted arbiter has two main advantages over the filter based arbiter.

The weighted arbiter requires fewer logic levels than the filter based arbiter and hence, can achieve better timing closure.

Depending on the application, the weight of each "filter" can be altered by changing its position in the weight vector, thus increasing flexibility of the arbiter.

The disadvantage of the arbiter is that it consumes more area than the filter based arbiter. This is due to the parallel comparators in the single stage 1163 to compare the weights of two threads. The user would need O (N2) such comparisons, which is not area friendly.

FIG. 12 illustrates a diagram of an embodiment of thread grouping to improve scalability of pipeline arbiter using two or more weighting factors. Table-1 1200 shows a group assignments for a plurality of threads. The memory scheduler uses a thread grouping scheme to reduce area, without sacrificing timing closure. The thread grouping logic is configured to arbitrate in a hierarchical manner by initially comparing the requests from threads within a thread group, and then arbitrating between the winning threads of each thread group to determine the winning thread supplied out of the arbitrator. Thread grouping allows fast resolution.

In order to minimize the area overhead associated with arbitrating among several threads, the memory scheduler allows the user to assign a group to each thread. One of the disadvantages of using the weighted arbiter is that the numbers of comparators increase in the order of N2 where N is the number of threads. In order to alleviate the problem, the memory scheduler allows the user to assign a group to each thread. The arbitration takes place in hierarchical manner (consisting of at most 2 levels of hierarchy) by comparing the request from threads within a thread group, and arbitrating between the winners of each group to determine the winning thread. The memory scheduler first arbitrates among the threads within the group to pick a group winner. Then, the group winners arbitrate among themselves to pick the final winner thread. Thus, the arbitration takes place in hierarchical manner by comparing the request from threads within a group, and arbitrating between the winners of each group to determine the winning thread.

For example, assume that there are 16 Sys threads, and threads 0, 2, 4, 6, 8, 10, 12, 14 are in group 0, and threads 1,

3, 5, 7, 9, 11, 13, 15 are in group 1. Now, the memory scheduler arbitrates between threads in group-0 to pick a winner thread. Assume that this thread is thread 4. At the same time, The memory scheduler also arbitrates among threads in group-1 to pick a winner thread. Assume that the winner thread is thread 7. Finally, the memory scheduler arbitrates between thread 4 and thread 7 to pick the winner thread. Now, consider an example shown in table-1 1200 where the threads are divided into four groups, group number 0-3.

In this case, the respective winners from each of the four groups are arbitrated in the second level of hierarchy to determine the winning thread.

The following rules are applied to assign thread grouping.

The design time parameter "thread_group" identifies a group. It has the following attributes:

Members denote the threads that are members of the group where 1) a group can have only threads as members and 2) a thread must be a member of exactly one group.

A design time parameter called auto_configure_groups N automatically configures the threads into N groups. If N>0, the thread_group parameter is redundant.

The thread group is assigned in the rtl_conf file by the following syntax: thread_group {{threads for first group} {threads for second group} ... }

For the example described in Table 1, the thread groups will be assigned as thread_group {{0, 1, 2, 3}, {4, 5, 6, 7}, {8, 9, 10, 11}, {12, 13, 14, 15}}.

The auto_configure_groups parameter is set to 1 by default, indicating all threads belong to a single group. It can be overridden in the rtl_conf file by the following syntax: auto_configure_groups N.

The following rules are applied during the derivation to set up the Register Transfer Language for The memory scheduler when auto_configure_groups parameter is set to 0.

The RTL first arbitrates among the threads within the group to pick a group winner. Then, the group winners arbitrate among themselves to pick the final winner thread.

The following rules are applied during the derivation to set up the RTL for The memory scheduler when auto_configure_groups parameter is set to N>0.

First N groups are setup by assigning them a group number in increasing order from 0 through N−1.

The threads are ordered in the following order: Priority threads in the order of bandwidth allocation followed by bandwidth threads in the order of bandwidth allocation followed by best effort threads in the order of their thread ID. For example, assume that threads 0, 13, 14 are priority threads with bandwidth allocation of 10, 40 and 20 respectively, 1, 2, 3, 4, 5 are bandwidth threads with allocation of 3, 4, 5, 6, 7 respectively, and the remaining threads are best effort threads. Note that thread 0 accumulates one credit every 10 cycles and thus has 10% bandwidth allocation, thread 13 accumulates one credit every 40 cycles and therefore has 2.5% bandwidth allocation, and so on. For this configuration, the thread ordering will be 0, 14, 13, 5, 4, 3, 2, 1, 6, 7, 8, 9, 10, 11, 12, and 15. Now, the threads are mapped to groups in a round robin fashion. In the example, if there are four groups (N=4), the thread to group mapping is depicted in Table-2 1270. Table-2 illustrates the auto group assignment.

The RTL first arbitrates among the threads within the group to pick a group winner. Then, the group winners arbitrate among themselves to pick the final winner thread.

By default, the thread_group parameter assigns all threads to the same group. In this case, the RTL is set up such that all threads arbitrate among each other, without any group information.

Thread grouping reduces the area of the memory scheduler as it now requires at most 2N+2 comparators, compared to the (N2−1)/2 comparators. However, two scheduling steps are done in a single clock cycle, thus reducing the maximum achievable frequency by approximately half.

Figure 13:
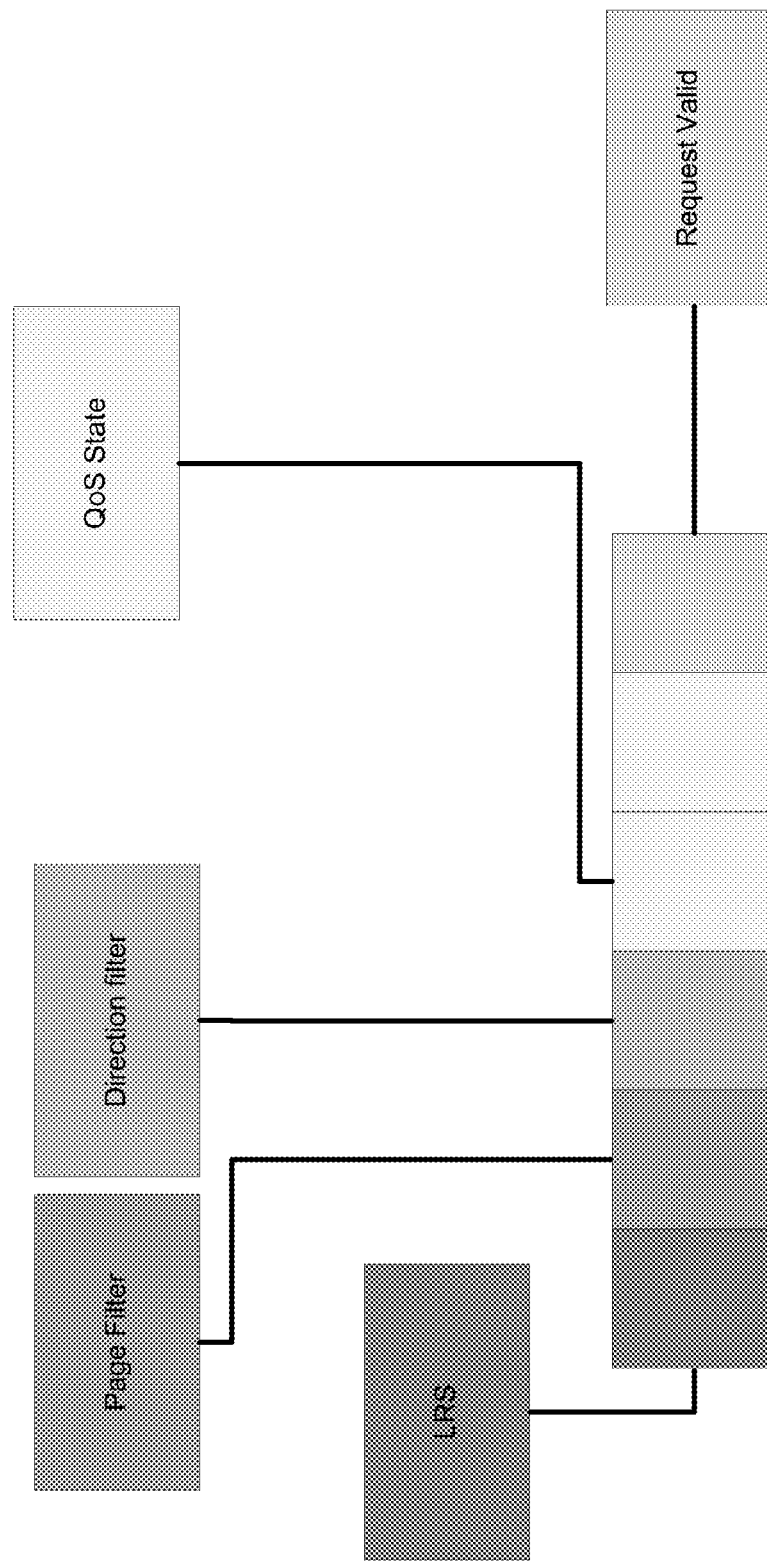
FIG. 13 a diagram of an embodiment of the weighted arbiter using an arbitration weight.

FIG. 13 a diagram of an embodiment of the weighted arbiter using an arbitration weight. The arbitration weight 1361 has removed the middle of group bit and same chip filter bit as well as reorder factors compared to the arbitration weight in figure 11. The memory scheduler allows the user to specify the order of the filters to be applied to generate the arbitration weight 1361 for each thread based on the different arbitration conditions. A design time parameter called scheduler_configuration enables the user to choose a different weight assignment scheme for the arbitration weight 1361. The default value of the parameter is given as follows:

scheduler_configuration{middle_of_group, qos, page, direction, chip}.

The user can either remove some of the filters, or change the ordering of the filters. For example, if the user assigns the following:

scheduler_configuration {qos, direction, page},

The arbiter weight is composed as shown in FIG. 13. Note that the request_valid bit and LRS bit will always be present.

In the example, the user has removed the middle_of_group bit and the same chip filter bit as well as swapped the order in which page filter and direction filter are applied.

Additional details are as follows.

In an embodiment, certain configuration checks need to be done in order to ensure that the new configuration parameters are set correctly.

The request group size parameter should be less than $2^8$

If thread_group parameter is present, each thread should be assigned to exactly one group, and every thread should have a group assignment.

If auto_configure_groups and thread_group are both present, a warning should be issued stating that the thread_group parameter will be ignored.

The number of groups must be less than or equal to the number of threads.

If page_preempt_count, page_idle_count, sched_repeat_delay, direction_group, or chip_group parameters are present in the RTL conf, a warning should be generated stating that these parameters are no longer supported.

The memory scheduler allows DDR DRAM memories to operate at 533 MHz and above (65 nm Artisan GP), because the memory scheduler has improved its operating frequency as well.

In an embodiment, the direction and chip filters include a direction count and chip count parameter respectively that disables the filter if so many requests in the same direction (and chip, respectively) are scheduled consecutively. The direction and chip filters may be an overkill as the QoS mechanism and the middle of group already take the responsibility of ensuring that threads with higher QoS requirements are given priority and at the same time, thread starvation is avoided. Hence, the direction/chip filters only look at the direction/chip of the request, and do not take the corresponding count into account.

Figure 14:
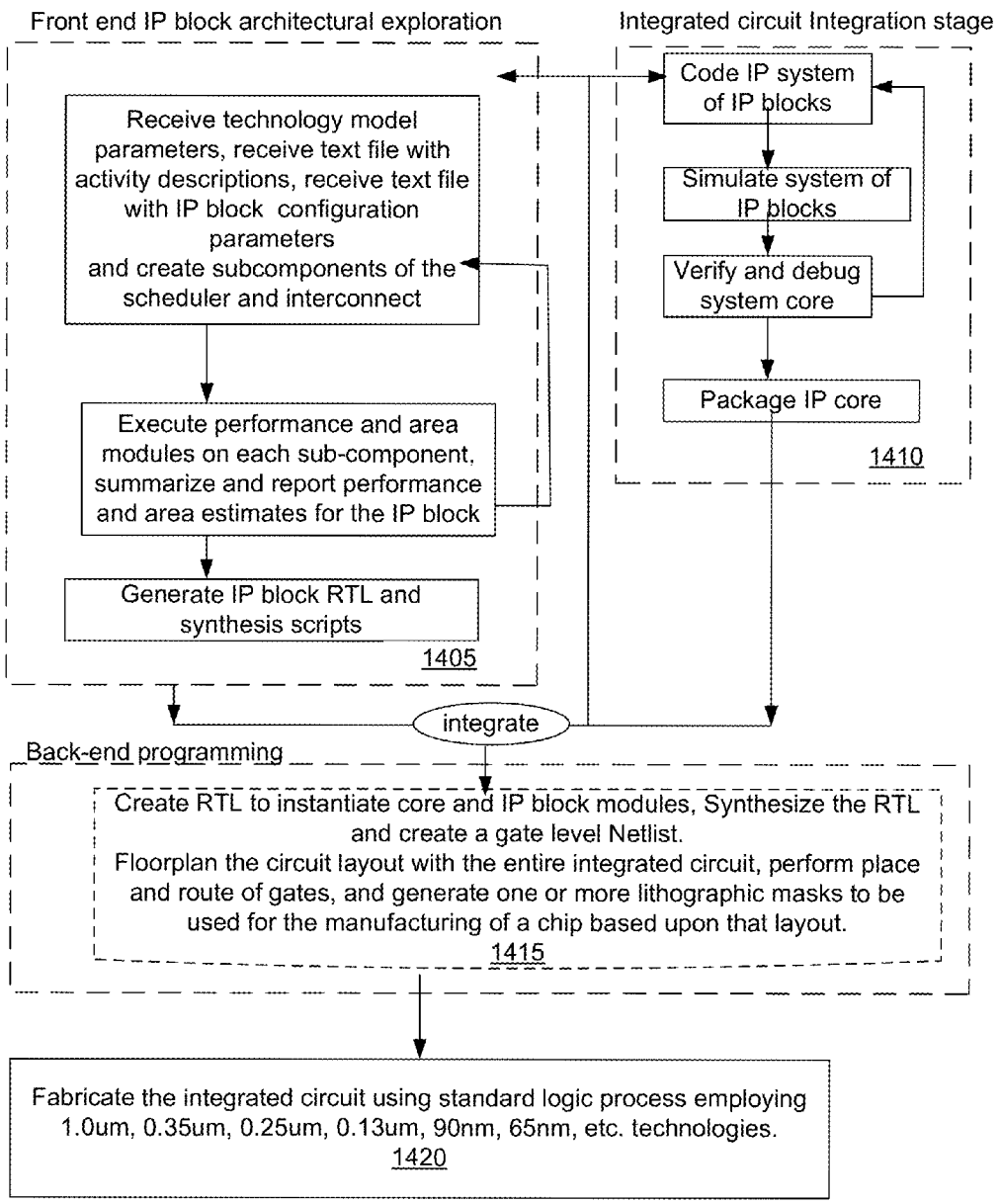
FIG. 14 illustrates a flow diagram of an embodiment of an example of a process for generating a device, such as a System on a Chip, with the designs and concepts discussed above for the Interconnect and Memory Scheduler.

FIG. 14 illustrates a flow diagram of an embodiment of an example of a process for generating a device, such as a System on a Chip, with the designs and concepts discussed above for the Interconnect and Memory Scheduler. The example process for generating a device with from designs of the Interconnect may utilize an electronic circuit design generator, such as a System on a Chip compiler, to form part of an Electronic Design Automation (EDA) toolset. Hardware logic, coded software, and a combination of both may be used to implement the following design process steps using an embodiment of the EDA toolset. The EDA toolset such may be a single tool or a compilation of two or more discrete tools. The information representing the apparatuses and/or methods for the circuitry in the Interconnect and Memory Scheduler, etc. may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses, or representations of the apparatuses such as simulations and lithographic masks, and/or methods described herein.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium.

Generally, the EDA toolset is used in two major stages of SOC design: front-end processing and back-end programming. The EDA toolset can include one or more of a RTL generator, logic synthesis scripts, a full verification testbench, and SystemC models.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 1405, the EDA tool set may receive a user-supplied text file having data describing configuration parameters and a design for at least part of a memory scheduler having a pipelined weighted arbiter. The data may include one or more configuration parameters for that IP block. The IP block description may be an overall functionality of that IP block such as an Interconnect, memory scheduler, etc. The configuration parameters for the Interconnect IP block and scheduler may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 1410, a separate design path in an ASIC or SOC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations, such as software coded models, to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 1415, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 1420, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCPDis2 to display socket activity, OCPPerf2 to analyze performance of a bundle, as well as other similar programs.

As discussed, an EDA tool set may be implemented in software as a set of data and instructions, such as an Instance in a software library callable to other programs or an EDA tool set consisting of an executable program with the software cell library in one program, stored on a machine-readable medium. A machine-readable storage medium may include any mechanism that stores information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In an embodiment, the logic consists of electronic circuits that follow the rules of Boolean Logic, software that contain patterns of instructions, or any combination of both. Various components described above may be implemented in hardware logic, software, or any combination of both.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

We claim:

1. An integrated circuit having an interconnect to communicate transactions between one or more initiator IP cores and one or more target IP cores coupled to the interconnect, comprising:

a memory scheduler coupled to a first target memory core of the one or more target IP cores that includes a bank of memories, where address space in the first target memory core is addressable through the memory scheduler, and the memory scheduler has a multiple stage arbiter to determine which transaction will access the first target memory core, wherein two or more stages perform computations and those computations combine to determine a winner of an arbitration process, and where the multiple stage arbiter uses two or more weighting factors affecting an arbitration decision that are processed in parallel selected from the group consisting of a Quality of Service (QoS) factor associated with each transaction, an absolute filter factor, a page-filter factor, a least recently serviced factor, a response valid factor, and a same chip filter, and where the first stage has logic configured to let a first transaction go through to be a candidate for arbitration when there is no other transactions whose current QoS level is higher than the QoS level of the first transaction.

2. The integrated circuit of claim 1, where the first transaction is 1) a write transaction, 2) a read transaction, or 3) any combination of the two, and is part of a thread of related transactions associated with a same ID.

3. The integrated circuit of claim 2, where a predictive scheduler in the memory scheduler checks out whether a page hit occurred for other related transactions to the first transaction one cycle earlier than the current arbitration decision and makes the current arbitration decision factoring in whether a page hit occurred.

4. The integrated circuit of claim 1, where the memory scheduler has a pipelined arbiter to determine which transaction will win the arbitration process to access the first target memory core, and the pipelined arbitration process within the multiple stage arbiter is configured to occur over a period of more than one clock cycle.

5. The integrated circuit of claim 1, where a predictive scheduler in the memory scheduler uses data from a previous cycle to make the arbitration decision about the first transaction during a current clock cycle in which the arbitration decision is made in order to increase overall system efficiency of transactions being serviced in the integrated circuit.

6. A machine-readable medium having data and instructions stored thereon, which, when executed by a machine, cause the machine to generate a representation of the integrated circuit of claim 1, wherein the machine-readable medium stores an Electronic Design Automation (EDA) toolset used in a System-on-a-Chip design process that has the data and instructions to generate the representations of the apparatus.

7. An integrated circuit having an interconnect to communicate transactions between one or more initiator IP cores and one or more target IP cores coupled to the interconnect, comprising:

a memory scheduler coupled to a first target memory core of the target IP cores, where address space in the first target memory core is addressable through the memory scheduler, and the memory scheduler has a multiple staged pipelined arbiter to determine which transaction will access the first target memory core, wherein a predictive scheduler in the memory scheduler uses data from a previous cycle to make the arbitration decision about a first transaction during a current clock cycle in which the arbitration decision is made in order to increase overall system efficiency of transactions being serviced in the integrated circuit, where the predictive scheduler checks out whether 1) a page hit, 2) a page miss and 3) any combination of the two occurs at least one cycle earlier than the current arbitration decision and makes the current arbitration decision factoring in whether either the page hit or the page miss occurred, and wherein pipelining occurs in stages within the pipelined arbiter over a period of more than one clock cycle, and the pipelined arbiter uses two or more weighting factors affecting an arbitration decision that are processed in parallel.

8. The integrated circuit of claim 7, wherein the two or more weighting factors includes a response valid factor that checks for sufficient space in the response buffer to hold the responses of a read transaction and overrides the transaction to be idle when there is not enough space in the response buffers and wherein the response valid factor for a write transaction, when all the data phases are not available, again, overrides the transaction to be idle, and where the response valid factor determination is performed in parallel with the page filter factor operation.

9. The integrated circuit of claim 7, wherein the two or more weighting factors includes a least recently serviced factor, a page-filter factor, a Quality of Service (QoS) factor, and a bus direction factor, and the pipelined arbiter is configured to process these weighting factors in parallel.

10. The integrated circuit of claim 7, wherein the pipelined arbiter splits a scheduling algorithm for arbitrating transactions into two cycles namely, a schedule step and an update step, where the schedule step of the algorithm applies the weighting factors that have been enabled, and where the update step in the predictive scheduler updates any QoS credit counters and QoS states registers, as well as page history registers after a determination occurs on which transaction will access the first target memory core.

11. A machine-readable medium having data and instructions stored thereon, which, when executed by a machine, cause the machine to generate a representation of the integrated circuit of claim 7, wherein the machine-readable medium stores an Electronic Design Automation (EDA) toolset used in a System-on-a-Chip design process that has the data and instructions to generate the representations of the apparatus.

12. The integrated circuit of claim 7, where the first transaction is 1) a write transaction, 2) a read transaction, or 3) any combination of the two, and is part of a thread of related transactions associated with a same ID.

13. The integrated circuit of claim 7, where the first transaction is 1) a write transaction, 2) a read transaction, or 3) any combination of the two, and is part of a thread of related transactions any combination of the two, and is part of a thread of related transactions mapped to a same group.

14. An integrated circuit having an interconnect to communicate transactions between one or more initiator IP cores and one or more target IP cores coupled to the interconnect, comprising:

a memory scheduler coupled to a first target memory core of the one or more target IP cores that includes a bank of memories, where address space in the first target memory core is addressable through the memory scheduler, and the memory scheduler has a multiple stage arbiter to determine which transaction will access the first target memory core, wherein two or more stages perform computations and those computations combine to determine a winner of an arbitration process, and where a first stage of the multiple stage arbiter factors in a Quality of Service (QoS) factor associated with each transaction, and the first stage has logic configured to let a first transaction go through to be a candidate for arbitration when there is no other transactions whose current QoS level is higher than the QoS level of the first transaction, and where the first transaction is 1) a write transaction, 2) a read transaction, or 3) any combination of the two, and is part of a thread of related transactions mapped to a same group.

15. The integrated circuit of claim 14, where a predictive scheduler in the memory scheduler checks out whether a page hit occurred for other related transactions to the first transaction one cycle earlier than the current arbitration decision and makes the current arbitration decision factoring in whether a page hit occurred.

16. A machine-readable medium having data and instructions stored thereon, which, when executed by a machine, cause the machine to generate a representation of the integrated circuit of claim 14, wherein the machine-readable medium stores an Electronic Design Automation (EDA) toolset used in a System-on-a-Chip design process that has the data and instructions to generate the representations of the apparatus.

17. An integrated circuit having an interconnect to communicate transactions between one or more initiator IP cores and one or more target IP cores coupled to the interconnect, comprising:
a memory scheduler coupled to a first target memory core of the target IP cores, where address space in the first target memory core is addressable through the memory scheduler, and the memory scheduler has a multiple staged pipelined arbiter to determine which transaction will access the first target memory core, wherein a predictive scheduler in the memory scheduler uses data from a previous cycle to make the arbitration decision about a first transaction during a current clock cycle in which the arbitration decision is made in order to increase overall system efficiency of transactions being serviced in the integrated circuit, where the predictive scheduler checks out whether 1) a page hit, 2) a page miss, and 3) any combination of the two occurs at least one cycle earlier than the current arbitration decision and makes the current arbitration decision factoring in whether either the page hit or the page miss occurred, and wherein the predictive scheduler also references an amount of QoS allotted credits already used for that transaction stored in counter and compares an amount already used to a limit on allotted credits for that transaction when making a determination on the current clock cycle transaction's QoS state.

18. The integrated circuit of claim 17, wherein the amount of QoS allotted credits already used is based on the previous clock cycle information of one cycle older QoS mode values rather than on the current clock cycle information, and wherein the predictive scheduler updates the QoS and page hit information in queues holding this information for a decision on the current arbitration cycle in the next cycle.

19. A machine-readable medium having data and instructions stored thereon, which, when executed by a machine, cause the machine to generate a representation of the integrated circuit of claim 17, wherein the machine-readable medium stores an Electronic Design Automation (EDA) toolset used in a System-on-a-Chip design process that has the data and instructions to generate the representations of the apparatus.

\* \* \* \* \*